US012112763B2

(12) United States Patent
Christian et al.

(10) Patent No.: US 12,112,763 B2
(45) Date of Patent: Oct. 8, 2024

(54) METHODS AND APPARATUS TO IDENTIFY SIGNALS USING A LOW POWER WATERMARK

(71) Applicant: The Nielsen Company (US), LLC, New York, NY (US)

(72) Inventors: Timothy Christian, Oldsmar, FL (US); Javon Lee, Greensboro, NC (US)

(73) Assignee: The Nielsen Company (US), LLC, New York, NY (US)

( * ) Notice: Subject to any disclaimer, the term of this patent is extended or adjusted under 35 U.S.C. 154(b) by 64 days.

(21) Appl. No.: 17/148,302

(22) Filed: Jan. 13, 2021

(65) Prior Publication Data

US 2021/0134306 A1    May 6, 2021

Related U.S. Application Data

(62) Division of application No. 15/927,810, filed on Mar. 21, 2018, now Pat. No. 10,923,133.

(51) Int. Cl.
*G10L 19/018* (2013.01)
*H04N 21/8358* (2011.01)

(52) U.S. Cl.
CPC ....... *G10L 19/018* (2013.01); *H04N 21/8358* (2013.01)

(58) Field of Classification Search
CPC .......................... G10L 19/018; H04N 21/8358
See application file for complete search history.

(56) References Cited

U.S. PATENT DOCUMENTS

| | | | |
|---|---|---|---|
| 5,949,885 | A | 9/1999 | Leighton |
| 6,718,047 | B2 | 4/2004 | Rhoads |
| 6,744,906 | B2 | 6/2004 | Rhoads et al. |
| 7,206,649 | B2 | 4/2007 | Kirovski et al. |
| 7,539,325 | B2 | 5/2009 | Rhoads et al. |
| 7,607,016 | B2 | 10/2009 | Brunk et al. |
| 7,739,718 | B1 | 6/2010 | Young et al. |
| 8,763,022 | B2 | 6/2014 | Ramaswamy |

(Continued)

FOREIGN PATENT DOCUMENTS

| | | |
|---|---|---|
| CA | 3094505 A1 | 9/2019 |
| CN | 112106101 A | 12/2020 |

(Continued)

OTHER PUBLICATIONS

International Searching Authority, "International Search Report," issued in connection with International Patent Application No. PCT/US2019/023441, mailed on Jul. 3, 2019, 3 pages.

(Continued)

*Primary Examiner* — Joseph Saunders, Jr.

(57) ABSTRACT

Methods, apparatus, systems and articles of manufacture are disclosed for signal identification using a low power watermark. Example apparatus for media identification based on watermarks includes a first processor to determine, in response to receiving a signal, if a first watermark is present in the signal using a first processing technique. The example first processor is further to provoke, in response to the first watermark being present in the signal, a second processing technique on a signal processor. The signal processor is to extract a second watermark in the signal using the second processing technique.

20 Claims, 12 Drawing Sheets

(56) References Cited

U.S. PATENT DOCUMENTS

| | | | |
|---|---|---|---|
| 8,959,016 | B2 | 2/2015 | McKenna et al. |
| 9,292,663 | B2 | 3/2016 | Levy |
| 9,641,857 | B2 | 5/2017 | Gish et al. |
| 10,923,133 | B2 | 2/2021 | Christian |
| 2005/0076219 | A1 | 4/2005 | De Bot |
| 2010/0058065 | A1 | 3/2010 | Celik et al. |
| 2011/0103444 | A1 | 5/2011 | Baum et al. |
| 2011/0144998 | A1* | 6/2011 | Grill ............... G10L 19/018 704/E21.001 |
| 2012/0203363 | A1 | 8/2012 | McKenna et al. |
| 2013/0152210 | A1* | 6/2013 | Petrovic ............. H04N 1/32144 726/26 |
| 2013/0251189 | A1 | 9/2013 | McMillan |
| 2014/0023226 | A1 | 1/2014 | Sharma |
| 2014/0237628 | A1 | 8/2014 | Petrovic |
| 2015/0161753 | A1 | 6/2015 | Blesser |
| 2016/0019901 | A1 | 1/2016 | Topchy et al. |
| 2017/0228848 | A1 | 8/2017 | Gish et al. |
| 2017/0262536 | A1 | 9/2017 | Topchy et al. |
| 2019/0295560 | A1 | 9/2019 | Christian |
| 2021/0134306 | A1 | 5/2021 | Christian |

FOREIGN PATENT DOCUMENTS

| | | |
|---|---|---|
| EP | 2787503 | 10/2014 |
| EP | 3769281 A1 | 1/2021 |
| EP | 3769281 A4 | 1/2022 |
| JP | 2012037701 | 2/2012 |
| WO | 2019183401 A1 | 9/2019 |

OTHER PUBLICATIONS

International Searching Authority, "Written Opinion," issued in connection with International Patent Application No. PCT/US2019/023441, mailed on Jul. 3, 2019, 6 pages.

United States Patent and Trademark Office, "Non-Final Office Action," issued in connection with U.S. Appl. No. 15/927,810, mailed on Jun. 3, 2019, 6 pages.

United States Patent and Trademark Office, "Non-Final Office Action," issued in connection with U.S. Appl. No. 15/927,810, mailed on Aug. 22, 2019, 11 pages.

United States Patent and Trademark Office, "Final Office Action," issued in connection with U.S. Appl. No. 15/927,810, mailed on May 1, 2020, 13 pages.

United States Patent and Trademark Office, "Notice of Allowance and Fee(s) Due," issued in connection with U.S. Appl. No. 15/927,810, mailed on Oct. 13, 2020, 8 pages.

Canadian Intellectual Property Office, "Examination Report," issued in connection with Canadian Patent Application No. 3,094,505, dated Oct. 20, 2021, 3 pages.

European Patent Office, "Extended European Search Report," issued in connection with European Patent Application No. 19771036.1, dated Sep. 12,. 2021, 9 pages.

International Bureau, "International Preliminary Report on Patentability," issued in connection with International Patent Application No. PCT/US2019/023441, mailed Oct. 1, 2020, 8 pages.

International Searching Authority, "International Preliminary Report on Patentability," issued in connection with PCT No. PCT/US2019/023441, Mar. 21, 2019, 7 pages.

European Patent Office, "Communication pursuant to Rules 161(2) and 162 EPC," issued in connection with European patent appl. No. 19771036.1-1210, Oct. 28, 2020, 3 pages.

European Patent Office, "Communication pursuant to Rule 70(2) and 70a(2) EPC," issued in connection with European patent appl. No. 19771036.1-1210, Jan. 5, 2022, 1 page.

Canadian Patent Office, "Examiner's Report," issued in connection with Canadian Patent Application No. 3,094,505, mailed on Oct. 31, 2022, (3 pages).

United States Patent and Trademark Office, "Non-Final Office Action, " issued in connection with U.S. Appl. No. 17/148,302, mailed on Jul. 22, 2022, 11 Pages.

United States Patent and Trademark Office, "Final Office Action," issued in connection with U.S. Appl. No. 17/148,302, mailed on Apr. 6, 2023, 10 Pages.

* cited by examiner

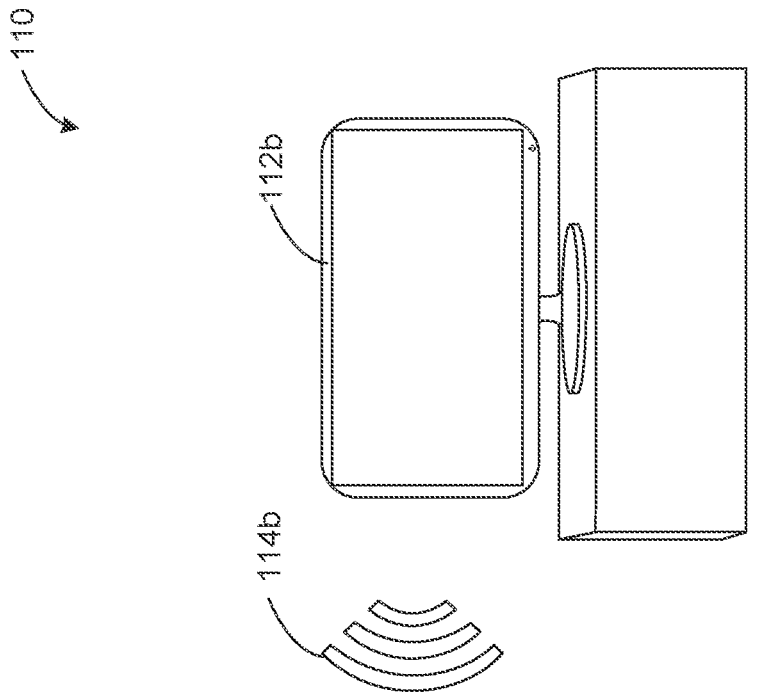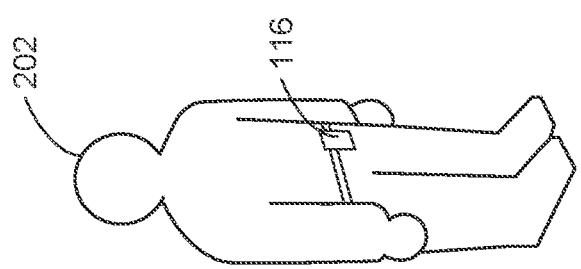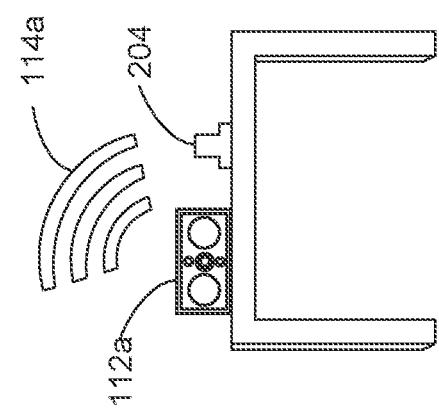
FIG. 2

METHODS AND APPARATUS TO IDENTIFY SIGNALS USING A LOW POWER WATERMARK

CROSS-REFERENCE TO RELATED APPLICATIONS

This patent arises from a divisional of U.S. patent application Ser. No. 15/927,810, (now U.S. Pat. No. 10,923,133), which was filed on Mar. 21, 2018. U.S. patent application Ser. No. 15/927,810 is hereby incorporated herein by reference in its entirety. Priority to U.S. patent application Ser. No. 15/927,810 is hereby claimed.

FIELD OF THE DISCLOSURE

This disclosure relates generally to watermarking, and, more particularly, to identifying signals using a low power watermark.

BACKGROUND

In recent years, use of metering devices to monitor media consumption has become more prevalent. Some metering devices are portable, enabling monitoring of media consumption as a participant moves among various settings and media exposures. Such metering devices may be attached to the belt or carried via other methods on the participant's body. As a result, demand has increased for metering devices with a smaller size and more efficient power usage to reduce, for example, charging frequency.

BRIEF DESCRIPTION OF THE DRAWINGS

FIG. 2 is a schematic illustration of the example household of FIG. 1 depicted in accordance with the teachings of this disclosure for media processing and identification in the household using a low power watermark.

The figures are not to scale. Wherever possible, the same reference numbers will be used throughout the drawing(s) and accompanying written description to refer to the same or like parts.

DETAILED DESCRIPTION

Figure 1:
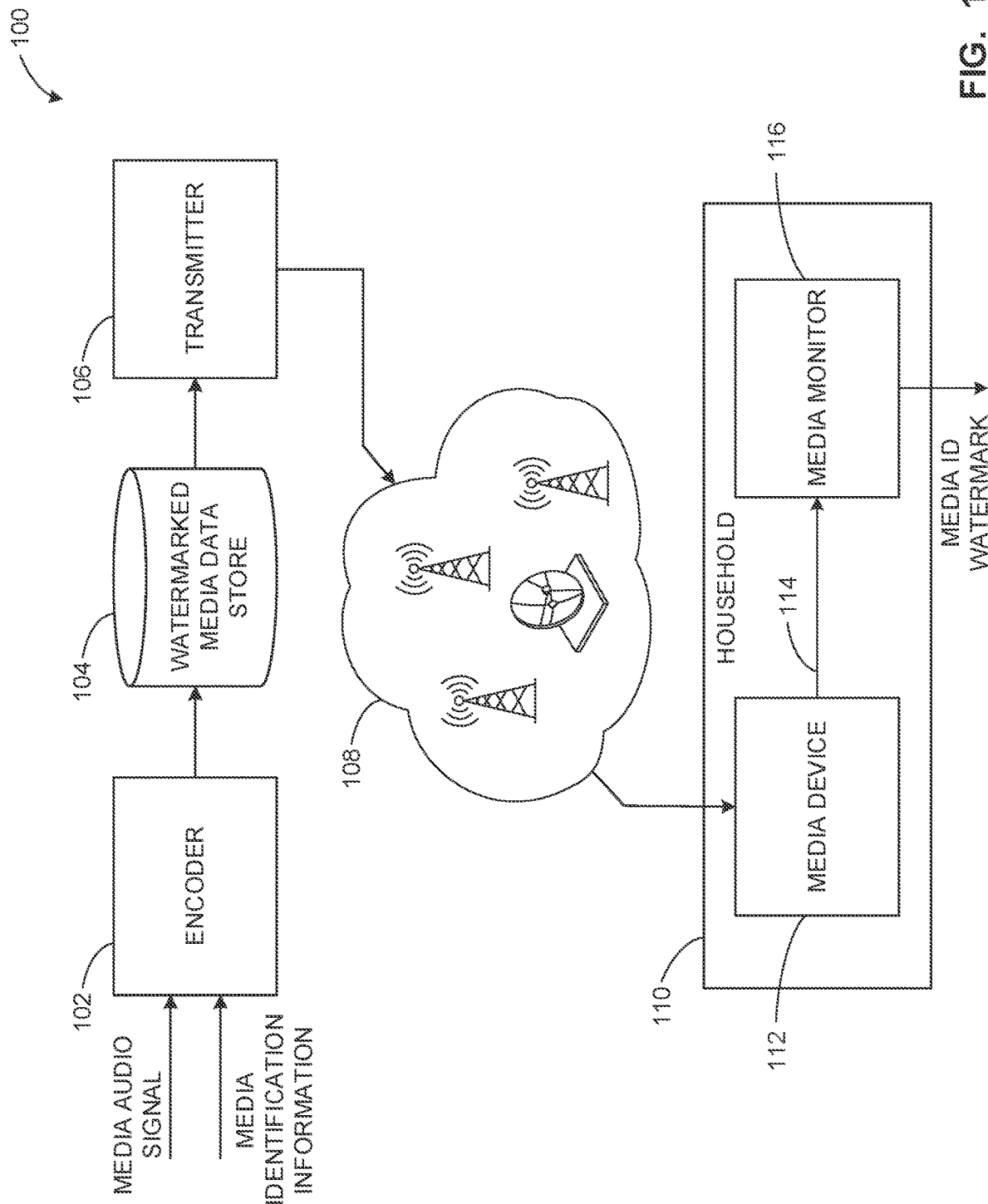
FIG. 1 is a schematic illustration of an example system constructed in accordance with the teachings of this disclosure for signal identification using a low power watermark.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks, etc.), such as media identifying information and/or an identifier that may be mapped to media identifying information, into an audio and/or video signal. In some examples, characteristics of the watermark are selected to hide the watermark (e.g., make the watermark inaudible, not visible, etc.). As used herein, the terms "code" or "watermark" are used interchangeably and are defined to refer to signal components that are inserted/embedded in the audio or video of media signals (e.g., a program or advertisement). In some examples, watermarks may be inserted for the purpose of identifying the media or for another purpose such as tuning (e.g., a packet identifying header). As used herein "media" refers to audio and/or visual (still or moving) content. In some implementations, to identify watermarked media, the watermark(s) are extracted and used to access a table of reference watermarks that are mapped to media identifying information.

Traditionally, media including watermarks is identified by a continuous process operating to identify the watermark. For example, a media signal corresponding to media playback is monitored by an audio recording device (e.g., on a media monitoring meter) and processed by a processor that finds and extracts watermarks and identifies the watermarked media based on the watermarks. Since watermarks typically correspond to the particular media with which they are associated, each watermark is unique and requires substantial processing to detect and identify within the recorded signal.

The device which processes watermarks may be, for example, a media monitor device (e.g., a meter). While some media monitors are configured to monitor a specific location (e.g., an entertainment room in a household), other media monitors are portable and carried around by a participant (e.g., a panelist). According to current trends and user expectations, portable media monitors should be small enough to be comfortably (preferably non-noticeably) carried on a person's body, and have a battery capacity such that frequent charging is not required. Current portable media monitors are approximately the size of a pager and are typically clipped to a user's hip, which may be uncomfortable and aesthetically displeasing to the participant. In order to reduce the size and enable a more comfortable and less noticeable portable media monitor, the battery size can be reduced. However, the decrease in battery capacity disadvantageously increases the frequency with which charging is required.

Conventionally, decreasing the form factor of portable media monitors and increasing the useful battery life has been difficult to achieve due to the significant processing power utilized by the traditional watermark detection techniques.

In example methods, systems, and articles of manufacture disclosed herein, a first watermarked (referred to herein as a low power watermark) is inserted/embedded in media signals to signal that a second watermark is simultaneously and/or subsequently encoded. The low power watermark is added to the media based on encoder rules, as well as characteristics of a media identification watermark in order to avoid interference between the low power watermark and the media identification watermark. The low power watermark may be consistent between numerous media signals to enable a low power processing technique to detect the low power watermark without the significant processing needed for a conventional watermark process. For example, the low power watermark may be a universal watermark that is generated using the same parameters for multiple signals pertaining to different media presentations. In some examples disclosed herein, the low power watermark is a sequence of bits encoded by modifying frequencies that are unique compared to frequencies of the media identification watermark and the audible output of the audio signal, to minimize audibility of the watermark. In some example low power watermarks, the low power watermark has a length equal to the media identification watermark and is included at least at the beginning of each identifiable media signal.

In some examples disclosed herein, a low power watermark encoded in media is detected by a low power processor including a low power watermark detector. In such examples, in response to the low power watermark being detected, the low power processor provokes a second processing technique on a signal processor (e.g., separate from the low power processor) that is responsible for finding and extracting unique media identification watermarks. In some examples, the signal processor may be in a standby mode, low power mode, etc. until the second processing technique is provoked. The second processing technique, upon being provoked, extracts the unique media identification watermark(s), for subsequent comparison to reference watermarks to determine media included in a signal. The second processing technique continues processing until media identification watermarks are no longer found, in which case the signal processor, in some examples, returns to a low power state. In some examples disclosed herein, the low power processor utilizes a low power processing technique such as a least means square adaptive algorithm that identifies the presence of the low power watermark using an adaptive linear filter and a comparison between a reference low power watermark and the output of the linear filter.

In contrast with conventional approaches to addressing media identification, example media monitors that identify media using both a low-power watermark and a traditional media identification watermark are more efficient and consequently enable utilization of a smaller battery and/or a smaller media monitor. Some techniques disclosed herein reduce power consumption by reducing the amount of time media watermark identification processing (e.g., as opposed to low power watermark processing), which is power intensive processing, is performed.

While the techniques disclosed herein are, in some examples, described in the context of portable media monitors, the techniques may be applied in a variety of applications, settings, or example implementations. Specifically, the techniques may be implemented in any watermark identification processing device and/or application to, for example, reduce power consumption.

FIG. 1 is a schematic illustration of an example system 100 constructed in accordance with the teachings of this disclosure for signal identification using a low power watermark. The example system 100 includes an example encoder 102, an example watermarked media data store 104, an example transmitter 106, an example communications network 108, and an example household 110. The example household 110 includes an example media device 112 that transmits an example watermarked audio signal 114 to an example media monitor 116.

The example encoder 102 of the illustrated example of FIG. 1 generates watermarks and incorporates watermarks into a media signal. The encoder 102 is configured by, operated by, and/or located at a service provider, a media provider, or any other entity. The example encoder 102 receives media and media identification information and outputs the media signal including the watermark(s). The example encoder 102 generates a media identification watermark based on the received media identification information. The media identification watermark is a unique identification watermark that is generated with amplitude, frequency, and phase characteristics such that it is practically inaudible when the media signal is output. Example systems for identifying media based on codes and/or signatures are long known and were first disclosed in Thomas, U.S. Pat. No. 5,481,294, which is hereby incorporated by reference in its entirety.

The example encoder 102 additionally generates a low power watermark. In some examples, the low power watermark is a watermark applied to media received by the encoder to enable a decoder to easily identify the low power watermark. The example low power watermark is a universal watermark that has similar characteristics regardless of the media signal it is embedded in. Alternatively, the low power watermark may be any other type of watermark that is added to a media signal to signal the insertion of an identification watermark. The example low power watermark may have different amplitude, wavelength, and/or phase than the media identification watermark in order to make the low power watermark distinct and easily differentiable. In some examples, the example low power watermark is additionally generated by the example encoder 102 with characteristics such as to make the low power watermark substantially inaudible.

The example encoder 102 outputs the media with the low power watermark and the media identification watermark included in the media signal. In some examples, the example encoder 102 may, in response to an unidentifiable media signal being input to the encoder, not generate any watermarks for the media signal. In such examples, the example encoder 102 may be configured to look for specific characteristics (e.g., specific audio frequencies wherein a media identification watermark may be embedded, etc.) in the media to determine if the media identification watermark should be generated. In some examples, the example encoder 102 generates a low power watermark when the media identification watermark is generated, and does not generate the watermark when the media identification watermark is not generated. In some examples, the example encoder 102 may be implemented, at least partially, as software.

The example watermarked media data store 104 of the illustrated example of FIG. 1 is a storage location for watermarked media. The example watermarked media data store 104 may be located at a media provider, at a service provider, a third-party storage facility, on a network, and/or at any other location. The watermarked media data store 104 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The watermarked media data store 104 may additionally or alternatively be implemented by one or more double data rate (DDR) memories, such as DDR, DDR2, DDR3, mobile DDR (mDDR), etc. The watermarked media data store 104 may additionally or alternatively be implemented by one or more mass storage devices such as hard disk drive(s), compact disk drive(s) digital versatile disk drive(s), etc. While in the illustrated example the watermarked media data store 104 is illustrated as a single database, the watermarked media data store 104 may be implemented by any number and/or type(s) of databases. Furthermore, the data stored in the watermarked media data store 104 may be in any data format such as, for example, binary data, comma delimited data, tab delimited data, structured query language (SQL) structures, etc.

The example transmitter 106 of the illustrated example of FIG. 1 transmits watermarked media from a service provider, a media provider, and/or any other entity, to the example communications network 108. In some examples, the example transmitter 106 transmits the watermarked media 104 at a media provider facility to a service provider facility for distribution to an audience. The example transmitter 106 may be an antenna based system, an internet streaming based system, a cable transmission system, a satellite transmission system, and/or any other type of transmission system. The example transmitter 106 accesses watermarked media from the watermarked media data store 104 and transmits the watermarked media via one or more example communications networks 108 for distribution to individual households (e.g., audience viewers).

The example communications network 108 of the illustrated example of FIG. 1 is a network that transmits watermarked media to a widespread audience. In some examples, the communications network 108 includes one or more facilities that receive watermarked media signals from the example transmitter 106 and process and transmit the watermarked media signals for distribution to the example household 110. In some examples, the communications network 108 may transmit watermarked media to the example household 110 in response to a condition and/or state of the example media device 112 in example household 110 (e.g., the media device 112 being tuned to a channel, the media device 112 requesting specific media content, etc.).

The example household 110 of the illustrated example of FIG. 1 is an audience location at which media is presented. In some examples, the household 110 includes multiple different audience members who may view one or more media presentations at any time. The example household 110 includes the example media device 112 and the example media monitor 116. While the household 110 is one example environment wherein the media device 112 and the media monitor 116 can be implemented, in some examples, the media monitor 116 is portable and is used to monitor media presented on a media device at a different location.

The example media device 112 of the illustrated example of FIG. 1 receives media transmitted to the example household 110. The example media device 112 outputs the example watermarked audio signal 114 within the example household 110. The example media device 112 may be a radio, television, computer, tablet, smart phone, and/or any other device that outputs audio and/or audiovisual media. The media device 112 may be connected to a cable television connection (e.g., via a set top box, etc.), may be connected to the Internet (e.g., via a wireless router, modem, etc.) and/or may be connected to any other infrastructure to receive media transmitted via the example communication network 108. In some examples, the example household 110 includes multiple media devices, which receive and present the same and/or different media. The media device 112 may include speakers, and/or other audio output components to present the example watermarked audio signal 114.

The example watermarked media transmitted to the example household 110 via the example communication network 108 is presented by the example media device 112 as the example watermarked audio signal 114. The example watermarked audio signal 114 includes audio, and may additionally or alternatively include video. The example media device 112 outputs the example watermarked audio signal 114 at a volume loud enough to be detected by the example media monitor 116.

The example media monitor 116 of the illustrated example of FIG. 1 is a device that receives the example watermarked audio signal 114. In some examples, the example media monitor 116 is a portable media monitor, carried by a participant in the example household 110. In some examples, the example media monitor 116 records the example watermarked audio signal 114 as it is output by the example media device 112. The example media monitor 116, after receiving the example watermarked audio signal 114, detects the low power watermark previously encoded in the watermarked audio signal 114 by the example encoder 102. In response to detecting the low power watermark, the example media monitor 116 processes the watermarked audio signal 114 to extract the previously encoded media identification watermark from the watermarked audio signal 114 for subsequent use in identifying the media corresponding to the presented watermarked audio signal 114. The example media monitor 116 may itself process the media identification watermark to identify the media (e.g., by comparing the media identification watermark to a reference database) and/or may transmit the media identification watermark to a central facility for identification of the media.

In operation, the example encoder 102 receives media and media identification information and encodes a low power watermark and media identification watermark into the signal conveying media. The example encoder then outputs the media with the low power watermark and the media identification watermark for storage in the example watermarked media data store 104. The example transmitter 106 accesses the watermarked media and transmits the watermarked media via the example communications network 108 to the example household 110. The example media device 114 receives the watermarked media and outputs the watermarked audio signal 114 which is received by the example media monitor 116. The example media monitor 116 then detects the presence of the low power watermark in the watermarked audio signal 114, triggering a second processing technique to extract and/or identify the media identification watermark.

FIG. 2 is an example implementation of the example household 110. The example household 110 includes example media devices 112*a*, 112*b*, example watermarked audio signals 114*a*, 114*b*, the example media monitor 116, an example audience member 202, and an example charging device 204.

The example media devices 112a, 112b are example implementations of the example media device 112 of FIG. 1. The example media device 112a is a radio that outputs the example watermarked audio signal 114a in the example household 110. The example media device 112b is a television that outputs the example watermarked audio signal 114b in the example household 110 and additionally outputs audiovisual media content. The example media devices 112a, 112b may output the same or different watermarked audio signals, and may output the signals simultaneously or at different times. In some examples, the example media monitor 116 may have difficulty discerning between the example audio watermarked signals 114a, 114b. In some examples, the example media monitor 116 may be configured to filter out signals being presented that do not include watermarks in order to more effectively process any watermarked audio signals being presented.

The example watermarked audio signals 114a, 114b are output by the example media devices 112a, 112b. In some examples, the example household 110 may include any number of media devices presenting any number of audio signals at any time.

The example audience member 202 is a person in the example household 110. In examples where the example media monitor 116 is a portable media monitor, the example audience member 202 carries the example media monitor 116 on their person. In the illustrated example of FIG. 2, the example audience member 202 carries the example media monitor 116 on their belt. In such an example, the media monitor 116 may only receive the example watermarked audio signal 114b from the example media device 112b, based on the orientation of the example media monitor 116.

The example charging device 204 recharges a battery for the example media monitor 116 in examples where the example media monitor 116 is a portable media monitor. The example charging device 204 requires the example media monitor 116 be kept on the charging station to charge the battery. In some examples, the example media monitor 116 may not be operational (e.g., capable of monitoring media, etc.) during the charging operation. It is naturally advantageous for the example media monitor 116 to be operational for as long as possible with few charging sessions, leaving charging for times when media is not being presented (e.g., at night, at times when no one is in the example household 110, etc.).

In operation, the example media devices 112a, 112b output watermarked audio signals 114a, 114b that are received by the example media monitor 116 carried by the example user 204. When the example media monitor 116 is low on battery power, the example media monitor 116 must be charged using the example charging device 204.

Figure 3:
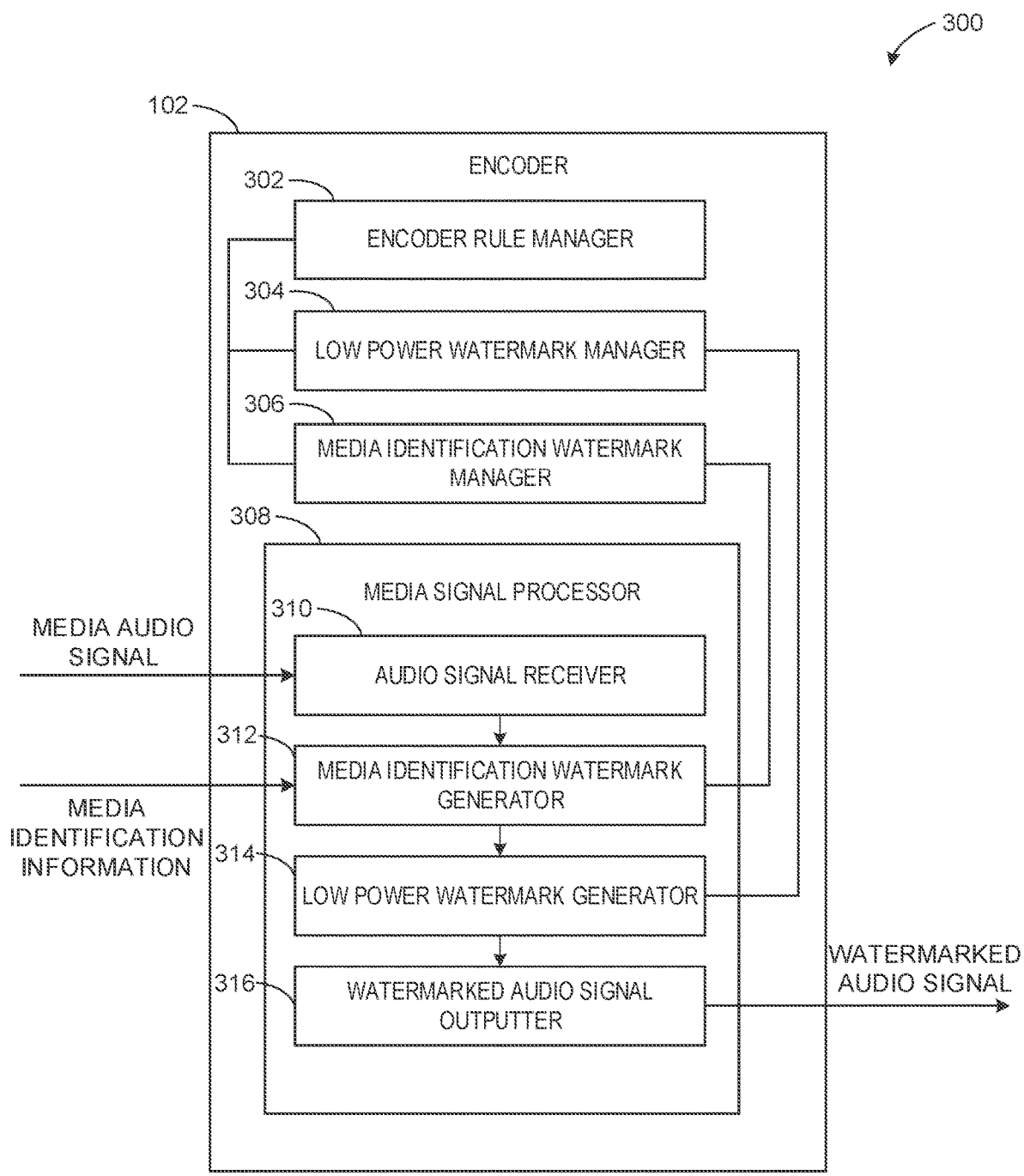
FIG. 3 is a block diagram showing an example implementation of the example encoder of FIG. 1.

FIG. 3 is a block diagram of an example implementation of the example encoder 102 of FIG. 1. The example encoder 102 includes an example encoder rule manager 302, an example low power watermark manager 304, an example media identification watermark manager 306, and an example media signal processor 308. The example media signal processor 308 includes an example audio signal receiver 310, an example media identification watermark generator 312, an example low power watermark generator 314, and an example watermarked audio signal outputter 316.

The example encoder rule manager 302 of the illustrated example of FIG. 3 is configured with rules associated with the encoding of audio watermarks. In some examples, the example encoder rule manager 302 is configured with rules such as an attack start time, an amplitude decay rate, a watermark length, audio envelope attack, sustain, and decay characteristics, etc. The example encoder rule manager 302 may be configured to control parameters to enable the example low power watermark manager 304 and the example media identification watermark manager 306 to set parameters for watermarks that do not interfere with the audio signal (e.g., do not create an audible artifact in the audio signal) and are in agreement with parameters of a decoder. The example encoder rule manager 302 may receive rules from a media provider, a service provider, and/or any other entity to ensure that watermarks are encoded in accordance with a decoding entity's preferences/requirements. For example, a media audience measurement entity may set the rules of the example encoder rule manager 302 based on developed standards/best practices to ensure that the watermarks may be reliably decoded for accurate audience measurement.

The example low power watermark manager 304 of the illustrated example of FIG. 3 configures parameters associated with the generation of a low power watermark. In some examples, the example low power watermark manager receives rules from the example encoder rule manager 302 to which the low power watermark must adhere. The example low power watermark manager 304 may be configured initially during a setup process of the example encoder 102. The example low power watermark manager 304 may determine a watermark length, frequency values, amplitude values, phase values, audio envelope characteristics (e.g., attack, sustain, decay, etc.) and/or any other relevant audio parameters defining the low power watermark. The example low power watermark manager 304 communicates rules and parameters specific to the low power watermark to the example low power watermark generator 314. In some examples, the example low power watermark manager 304 is configured identically between multiple encoders such that the low power watermark has consistent characteristics across media. The example low power watermark manager 304 may be in communication with the example media identification watermark manager 306 to ensure the low power watermark has different characteristics than the media identification watermark, and will consequently be identifiable.

The example media identification watermark manager 306 of the illustrated example of FIG. 3 configures parameters associated with the generation of a media identification watermark. In some examples, the example media identification watermark manager 306 receives rules from the example encoder rule manager 302 to which the media identification watermark must adhere. The example media identification watermark manager 306 may be configured with general rules regarding restrictions on watermark length, amplitude decay, frequency values, phase values, audio envelope characteristics, etc. In some examples, the example media identification watermark manager 306 communicates rules and parameters specific to the media identification watermark to the example media identification watermark generator 312. The example media identification watermark manager 306 may communicate rules that act as boundary conditions and restrictions on watermark implementation, as opposed to explicitly defining the media identification watermark, which will be vary based on the specific media audio signal.

The example media signal processor 308 of the illustrated example of FIG. 3 receives audio signals, incorporate watermarks into the audio signals, and output audio signals. The example media signal processor 308 receives media audio signals as well as media identification information and outputs a watermarked audio signal. The example media signal processor 308 includes the example audio signal receiver 310, the example media identification watermark generator 312, the example low power watermark generator 314, and the example watermarked audio signal outputter 316.

The example audio signal receiver 310 of the illustrated example of FIG. 3 receives media audio signals for watermarking. In some examples, the audio signal receiver 310 receives the audio signals via a network (e.g., the Internet) from a media content provider or other entity. The example audio signal receiver 310 subsequently transmits the media audio signal to the example media identification watermark generator 312 and/or the example low power watermark generator 314 for implementation of watermarks.

Figure 6:
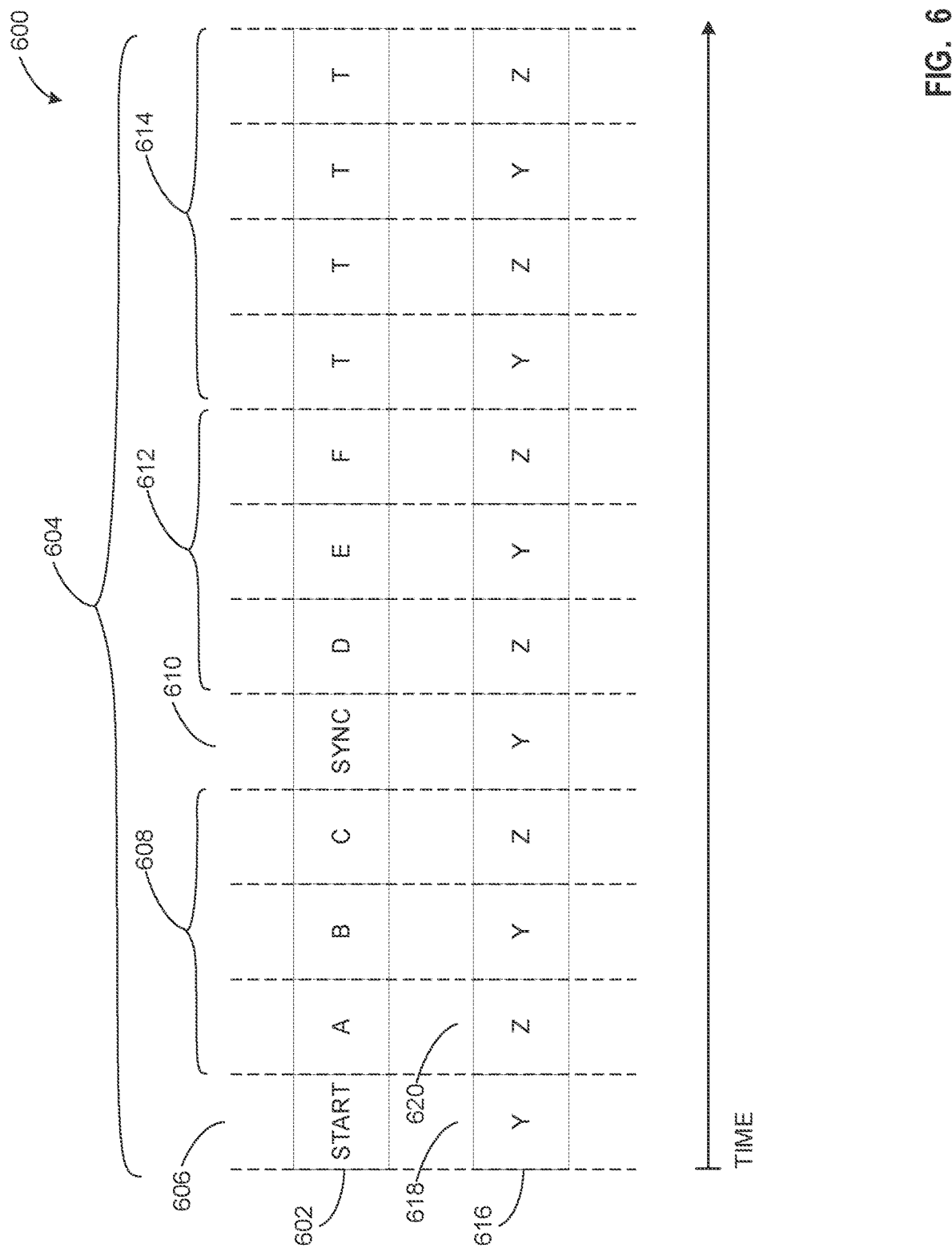
FIG. 6 is a schematic of an example implementation of a media identification watermark and a low power watermark.

The example media identification watermark generator 312 of the illustrated example of FIG. 3 generates media identification watermarks based on the rules and parameters maintained by the example media identification watermark manager 306 and based on media identification information. The example media identification watermark generator 306 receives media identification information pertaining to the media audio signal received by the example audio signal receiver 310. The media identification information may be encoded in the watermark included in the audio signal. In some examples, the media identification information may be a reference watermark previously generated for the media. In such an example, the media identification watermark generator 312 incorporates the reference watermark into the audio signal, and/or generates a watermark based on the reference watermark. In some examples, the example media identification watermark generator 312 analyzes the media audio signal received by the example audio signal receiver 310, and generates, based on the parameters set by the media identification watermark manger 306, a media identification watermark. In such an example, a separate encoder may generate the media identification watermark based on a similar set of parameters to those of the example media identification watermark manager 306. In such an example, when similar media is conveyed in the signal, a similar media identification watermark is generated for the same media, thus enabling multiple encoders to generate similar media identification watermarks. In some examples, the example media identification watermark generator 312 may additionally access and/or receive metadata associated with the media audio signal that provides additional parameters and/or characteristic information associated with the media audio signal to enable an optimal and/or consistent watermark placement for the media audio signal. In some examples, the example media identification watermark generator 312 may communicate with the example low power watermark generator 314 to ensure the media identification watermark does not have conflicting characteristics with the low power watermark that may cause interference and difficulty detecting and/or extracting the watermarks. An example implementation of the media identification watermark, as can be generated by the example media identification watermark generator 312, is illustrated in FIG. 6.

The example low power watermark generator 314 of the illustrated example of FIG. 3 generates low power watermarks based on the rules and parameters maintained by the example low power watermark manager 304. In some examples, the example low power watermark generator 314 is in communication with the example media identification watermark generator 312 to ensure the low power watermark does not have interfering characteristics relative to the example media identification watermark. In some examples, the low power watermark generator 314 generates a low power watermark for every instance of a media identification watermark. In some examples, the low power watermark has different frequency, amplitude, and/or phase characteristics such as to be distinct from the media identification watermark, and to be substantially inaudible. In some examples, the example low power watermark generator 314 generates a low power watermark at the beginning (e.g., the first instance, etc.) of the media identification watermark. In such examples, the example low power watermark generator 314 may only generate one or more low power watermarks to indicate the start of a media audio signal. In such an example, the example low power watermark generator 314 may access the media identification information accessed by the example media identification watermark generator 312 to determine when a media audio signal begins and/or ends. In some examples, the example low power watermark generator 314 may modify the media identification watermark to introduce low power watermark characteristics, creating a low power watermark integrated into the media identification watermark. For example, the example low power watermark generator 314 may alter the start bit (e.g., indicating the start of the media identification watermark) and the sync bit (e.g., a bit used to align and decode an incoming asynchronous media identification watermark) to have characteristics that are distinct and easily identifiable by a low power process on a decoder. In some examples, the low power watermark has repeatable audio characteristics, such as alternating between two distinct frequencies. The example low power watermark generator 314 may generate any low power watermark such that the watermark is distinct from the media identification watermark and is identifiable. The example low power watermark generator 314 may generate a watermark with characteristics similar to the example low power watermark of the illustrated example of FIG. 6.

The example watermarked audio signal outputter 316 of the illustrated example of FIG. 3 outputs the watermarked audio signal. In some examples, the example watermarked audio signal outputter 316 outputs the watermarked audio signal to a data store, such as the example watermarked media data store 104 of the illustrated example of FIG. 1. In some examples, the example watermarked audio signal outputter 316 acts as a transmitter and transmits the watermarked audio signal to a communications network and/or to a platform for presentation to an audience.

In operation, the example encoder rules manager 302 maintains overall parameters associated with watermarking, working in conjunction with the example low power watermark manager 304 and the example media identification watermark manager 306 to set characteristics surrounding the generation of watermarks for media received by the encoder. The example media signal processor 308 processes newly received audio signals by first receiving the media audio signal via the example audio signal receiver 310. The example media identification watermark generator 312 then receives media identification information and generates a media identification watermark for the media audio signal. The example low power watermark generator 314 generates a low power watermark for the media audio signal. Finally, the example watermarked audio signal outputter 316 outputs the watermarked audio signal including the media identification watermark and the low power watermark.

While an example manner of implementing the example encoder 102 of FIG. 1 is illustrated in FIG. 3, one or more of the elements, processes and/or devices illustrated in FIG. 3 may be combined, divided, re-arranged, omitted, eliminated and/or implemented in any other way. Further, the example encoder rule manager 302, the example low power watermark manager 304, the example media identification watermark manager 306, the example media signal processor 308, the example audio signal receiver 310, the example media identification watermark generator 312, the example low power watermark generator 314, the example watermarked audio signal outputter 316 and/or, more generally, the example encoder 102 of FIG. 3 may be implemented by hardware, software, firmware and/or any combination of hardware, software and/or firmware. Thus, for example, any of the example encoder rule manager 302, the example low power watermark manager 304, the example media identification watermark manager 306, the example media signal processor 308, the example audio signal receiver 310, the example media identification watermark generator 312, the example low power watermark generator 314, the example watermarked audio signal outputter 316 and/or, more generally, the example encoder 102 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example encoder rule manager 302, the example low power watermark manager 304, the example media identification watermark manager 306, the example media signal processor 308, the example audio signal receiver 310, the example media identification watermark generator 312, the example low power watermark generator 314, the example watermarked audio signal outputter 316 and/or, more generally, the example encoder 102 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example encoder 102 of FIG. 1 may include one or more elements, processes and/or devices in addition to, or instead of, those illustrated in FIG. 3, and/or may include more than one of any or all of the illustrated elements, processes and devices.

Figure 4:
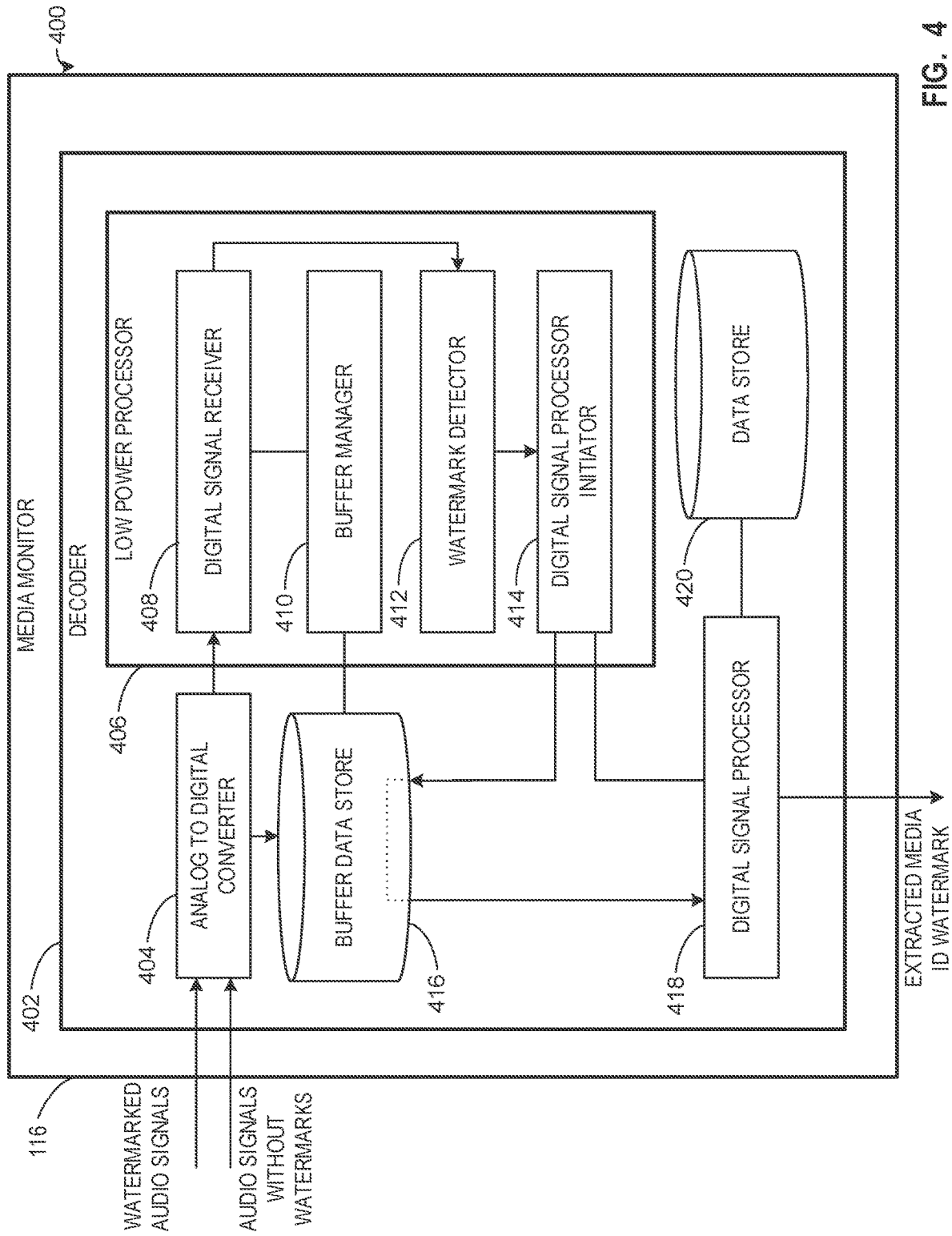
FIG. 4 is a block diagram showing an example implementation of the example media monitor of FIG. 1.

FIG. 4 is a block diagram showing an example implementation of the example media monitor 116 of FIG. 1. The example media monitor 116 includes an example decoder 402. The example decoder 402 includes an example analog to digital converter 404, an example low power processor 406, an example digital signal receiver 408, an example buffer manager 410, an example watermark detector 412, an example digital signal processor initiator 414, an example buffer data store 416, an example digital signal processor 418, and an example data store 420.

The example decoder 402 of the illustrated example of FIG. 4 decodes watermarks in watermarked audio signals received by the example media monitor 116. The example decoder 402 includes the example low power processor 406 to detect a low power watermark in the watermarked audio signal and an example digital signal processor 418 to extract a media identification watermark from the watermarked audio signal. In some examples, the example decoder 402 may be implemented, at least partially, as software. In some examples, the decoder 402 receives, additionally or alternatively to watermarked audio signals, audio signals without watermarks, and/or with watermarks that are not identifiable. The example decoder 402 includes an example low power processor including an example watermark detector 412 to continually process the audio signals received by the example decoder 402 and determine if recognizable watermarks are present. The example decoder 402 thus saves power by running the example digital signal processor 418 following the determination that recognizable watermarks are present by the example watermark detector 412.

The example analog to digital converter 404 of the illustrated example of FIG. 4 receives audio signals and convert the audio signals to a digital format. The example analog to digital converter 404 converts the watermarked audio signals and/or audio signals without watermarks to digital signals in order for the signals to be more easily analyzed by the example low power processor 406 and the example digital signal processor 418. In some examples, the example analog to digital converter 404 transmits the digital message to the example digital signal receiver 408 of the example low power processor 406, as well as to the example buffer data store 416. In some examples, the audio signals may be received by the example decoder in a digital format. In such an example, the example analog to digital converter 404 may simply transmit the audio signals to the example digital signal receiver 408 and the example buffer data store 416 in their original format.

The example low power processor 406 of the illustrated example of FIG. 4 detects low power watermarks and provoke the example digital signal processor 418 to extract media identification watermarks. The example low power processor 406 includes the example digital signal receiver 408 for receiving audio signals, the example buffer manager 410 for maintaining the example buffer data store 416, an example watermark detector 412 for detecting low power watermarks, and an example digital signal processor initiator 414 for provoking the example digital signal processor 418.

The example digital signal receiver 408 of the illustrated example of FIG. 4 receives signals processed by the example analog to digital converter 404. In some examples, the example digital signal receiver 408 may directly receive audio signals as they are transmitted to the example media monitor, in examples where the audio signals are transmitted as digital signals. In some examples, the example digital signal receiver 408 communicates with the example buffer manager 410 upon receiving an audio signal to inform the example buffer manager 410 of a time corresponding with receipt of the audio signal. The example digital signal receiver 408 transmits the audio signal to the example watermark detector 412. In some examples, the audio signal may be directly transmitted to the example watermark detector 412 upon receipt at the example decoder 402. In some examples, instead of the audio signals being transmitted to the example low power processor 406, the watermarked audio signals may be stored in the example buffer data store 416 and accessed by the example watermark detector 412 to determine the presence of the low power watermark.

The example buffer manager 410 of the illustrated example of FIG. 4 maintains the example buffer data store 416. In some examples, the buffer manager 410 determines if audio signal(s) stored in the example buffer data store 416 are currently being processed, and deletes the audio signal(s) if a predetermined buffer period has passed and the audio signals are not being processed. In such examples, the predetermined buffer period may be an amount of time corresponding to the amount of time the example watermark detector 412 requires to determine if a low power watermark is present in the audio signal(s). In some examples, the example buffer manager 410 begins a timer upon determining an audio signal has been received by the example digital signal receiver 408 and/or the example buffer data store 416. In such examples, upon the timer value associated with an audio signal satisfying a threshold (e.g., reaching the predetermined buffer period, a size limit, etc.), in the absence of a signal from the example watermark detector indicating a low power watermark has been detected and/or a signal from the example digital signal processor indicating the signal is being processed, the audio signal is deleted. In some examples, the example buffer manager 410 may determine if the digital signal processor is in a high power state (e.g., awake), indicating the audio signals in the buffer may currently be undergoing processing. In some examples, the example buffer manager 410 may determine whether the audio signals are being processed by the example watermark detector 412 and/or the example digital signal processor 418 based on an indication from the example buffer data store 416 (e.g., an indicator that the data is currently being accessed). In such examples, the example buffer manager 410 may delete the audio signals once the data is no longer being processed, based on the indication from the example buffer data store 416.

The example watermark detector 412 of the illustrated example of FIG. 4 detects the presence of a low power watermark in the audio signal. In some examples, the example watermark detector 412 is informed as to the characteristics of the low power watermark that are added by the encoder (e.g., added by the example low power watermark generator 314 of the example encoder 102 of FIG. 2). The example watermark detector 412 utilizes a least means squares algorithm, described in further detail in the block diagram 500 of FIG. 5. In some examples, the example watermark detector 412 outputs an error value, representing a difference between the known low power watermark and the watermark found by the example watermark detector 412 in the audio signal. In such examples, the example digital signal processor initiator 414 may determine if the error value satisfies a threshold (e.g., is below a certain value) to indicate that the low power watermark has been detected. In some examples, the example watermark detector 412 itself may determine if the error value satisfies the threshold and outputs a determination to the example digital signal processor initiator 414 as to whether the low power watermark was found. In some examples, the example watermark detector 412 continually analyzes any signal added to the example buffer data store 416 to determine if the low power watermark is present. The example watermark detector 412, upon finding the low power watermark, may communicate with the example digital signal process initiator 414 to provoke the example digital signal processor 418 to extract media identification watermarks. In some examples, the example watermark detector 412 may be made inactive (e.g., in a lower power state relative to an active power state) when the example digital signal processor 418 is processing a signal. In such an example, the example digital signal processor 418 is made inactive once a threshold amount of time, and/or amount of the audio signal under analysis, passes without finding a media identification watermark to extract. In such an example, when the example digital signal processor 418 is made inactive, the example watermark detector 412 becomes fully active again (e.g., enters a higher power state relative to the lower power state) and continues continually analyzing any signal added to the example buffer data store 416.

The example digital signal processor initiator 414 of the illustrated example of FIG. 4 is responsible for performing operations to ensure the example digital signal processor 418 extracts media identification watermarks from a watermarked audio signal in response to the example watermark detector 412 detecting the low power watermark in the watermarked audio signal. The example digital signal processor initiator 414 may receive a determination from the example watermark detector 412 that a watermarked audio signal currently being processed includes the low power watermark. In response to such a determination, the example digital signal processor initiator 414 communicates with the example digital signal processor 418 to provoke the example digital signal processor 418 to extract media identification watermarks from the watermarked audio signal. In some examples, the example digital signal processor initiator 414 may provoke the example digital signal processor 418 to enter an active (e.g., higher power) state to perform a processing technique (e.g., the watermark extraction). In some examples, the watermark detector 412 additionally or alternatively communicates with the example buffer data store 416 to transmit the watermarked audio signal to the example digital signal processor 418. In some examples, the example buffer data store 416 transmitting the watermarked audio signal to the example digital signal processor 418 may be sufficient to provoke the example digital signal processor. In some examples, the example digital signal processor initiator 414 may communicate with the example buffer manager 410 to ensure that the watermarked audio signals (as identified by the example watermark detector 412) in the example buffer data store 416 are not deleted, at least until the media identification watermarks are extracted from the watermarked audio signals.

The example buffer data store 416 of the illustrated example of FIG. 4 is used to store audio signals received by the example decoder 402 until the audio signals are determined to not include identifiable watermarks, or until media identification watermarks are extracted from the audio signals including identifiable watermarks. The example buffer data store 416 transmits signals that have been identified to be watermarked audio signals (e.g., by the example watermark detector 412, as indicated by the example digital signal processor initiator 414) to the example digital signal processor 418. The example buffer data store 416 is managed by the example buffer manager 410. In some examples, the example buffer data store 416 may be managed by any other component of the example media monitor 116, and/or may include logic internal to the example buffer data store 416 for management of the audio signals stored in the example buffer data store 416. The example buffer data store 416 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example buffer data store 416 may additionally or alternatively be implemented by one or more double data rate (DDR) memories, such as DDR, DDR2, DDR3, mobile DDR (mDDR), etc. The example buffer data store 416 may additionally or alternatively be implemented by one or more mass storage devices such as hard disk drive(s), compact disk drive(s) digital versatile disk drive(s), etc. While in the illustrated example the buffer data store 416 is illustrated as a single database, the example buffer data store 416 may be implemented by any number and/or type(s) of databases. Furthermore, the data stored in the example buffer data store 416 may be in any data format such as, for example, binary data, comma delimited data, tab delimited data, structured query language (SQL) structures, etc.

The example digital signal processor 418 of the illustrated example of FIG. 4 extracts media identification watermarks from watermarked audio signals. In some examples, the example digital signal processor 418 may be configured to identify characteristics of the watermarked audio signal corresponding to the parameters of an encoder that generated the media identification watermarks (e.g., parameters as set by the example encoder rule manager 302 and the example media identification watermark manager 306 of the illustrated example of FIG. 3) to extract a media identification watermark from the watermarked audio signals. In some examples, the example digital signal processor 418 remains in a low power state (e.g., such as a sleep mode) unless the example watermark detector 412 detects the low power watermark, indicating the presence of watermarked audio signals, or unless the digital signal processor 418 is currently extracting media identification watermarks from a watermarked audio signal. In such examples, the example digital signal processor 418 may be configured with a threshold amount of time (or a threshold amount of the audio signal) after which, if no further media identification watermarks are found and extracted when analyzing a watermarked audio signal, the example digital signal processor 418 returns to the low power state. In some examples, the example digital signal processor 418 may only remain in a processing state (e.g., a higher power state) if the low power watermark is detected, as indicated by the example watermark detector 412 and/or communicated by the example digital signal processor initiator 414. In some examples, the example digital signal processor 418 stores the extracted media identification watermarks and/or the watermarked audio signals in the example data store 420. In some examples, the example digital signal processor 418 transmits the extracted media identification watermarks to a component on the example media monitor 116 and/or a component located at a central facility for identification and attribution of the media based on the media identification watermarks.

The example data store 420 of the illustrated example of FIG. 4 is a storage location for the storage of data associated with the extraction of media identification watermarks. In some examples, the example digital signal processor 418 may store the extracted media identification watermarks in the example data store 420. In some examples, the example digital signal processor 418 may transmit the watermarked audio signal to be stored in the example data store 420, in a case where, for example, the watermarked audio signal is stored until the media identification watermark is identified. In some examples, the example data store 420 may act as an additional buffer, storing the watermarked audio signals and/or the extracted media identification watermarks for a certain amount of time after the extraction of the media identification watermarks. The example data store 420 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example data store 420 may additionally or alternatively be implemented by one or more double data rate (DDR) memories, such as DDR, DDR2, DDR3, mobile DDR (mDDR), etc. The example data store 420 may additionally or alternatively be implemented by one or more mass storage devices such as hard disk drive(s), compact disk drive(s) digital versatile disk drive(s), etc. While in the illustrated example the example data store 420 is illustrated as a single database, the example data store 420 may be implemented by any number and/or type(s) of databases. Furthermore, the data stored in the example data store 420 may be in any data format such as, for example, binary data, comma delimited data, tab delimited data, structured query language (SQL) structures, etc.

In operation, the example media monitor 116 includes an example decoder 402, including an example analog to digital converter 404 that receives watermarked audio signals and audio signals without watermarks. The example analog to digital converter 404 converts the analog audio signals to digital audio signals that are transmitted to the example low power processor 406. Specifically, the digital audio signals are transmitted to the example digital audio signal receiver 408 and to the example buffer data store 416. The example buffer manager 410 manages the example buffer data store to delete audio signals that have been processed and/or will not be processed (e.g., due to not including watermarks). The example watermark detector 412 receives the audio signal from the example digital signal receiver 408 and determines if the audio signal includes a low power watermark. In response to the audio signal including the lower power watermark, the example digital signal processor initiator 414 communicates with the example buffer data store 416 to have the watermarked audio signal transmitted to the example digital signal processor 418. The example digital signal processor 418 then extracts media identification watermarks from the watermarked audio signal and may store the extracted media identification watermark in the example data store 420.

While an example manner of implementing the example media monitor 116 of FIGS. 1 and 2 is illustrated in FIG. 4, one or more of the elements, processes and/or devices illustrated in FIG. 4 may be combined, divided, re-arranged, omitted, eliminated and/or implemented in any other way. Further, the example decoder 402, the example analog to digital converter 404, the example low power processor 406, the example digital signal receiver 408, the example buffer manager 410, the example watermark detector 412, the example digital signal processor initiator 414, the example buffer data store 416, the example digital signal processor 418, the example data store 420 and/or, more generally, the media monitor 116 of FIG. 4 may be implemented by hardware, software, firmware and/or any combination of hardware, software and/or firmware. Thus, for example, any of the example decoder 402, the example analog to digital converter 404, the example low power processor 406, the example digital signal receiver 408, the example buffer manager 410, the example watermark detector 412, the example digital signal processor initiator 414, the example buffer data store 416, the example digital signal processor 418, the example data store 420 and/or, more generally, the media monitor 116 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example decoder 402, the example analog to digital converter 404, the example low power processor 406, the example digital signal receiver 408, the example buffer manager 410, the example watermark detector 412, the example digital signal processor initiator 414, the example buffer data store 416, the example digital signal processor 418, the example data store 420 and/or, more generally, the media monitor 116 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitor 116 of FIGS. 1-2 may include one or more elements, processes and/or devices in addition to, or instead of, those illustrated in FIG. 4, and/or may include more than one of any or all of the illustrated elements, processes and devices.

Figure 5:
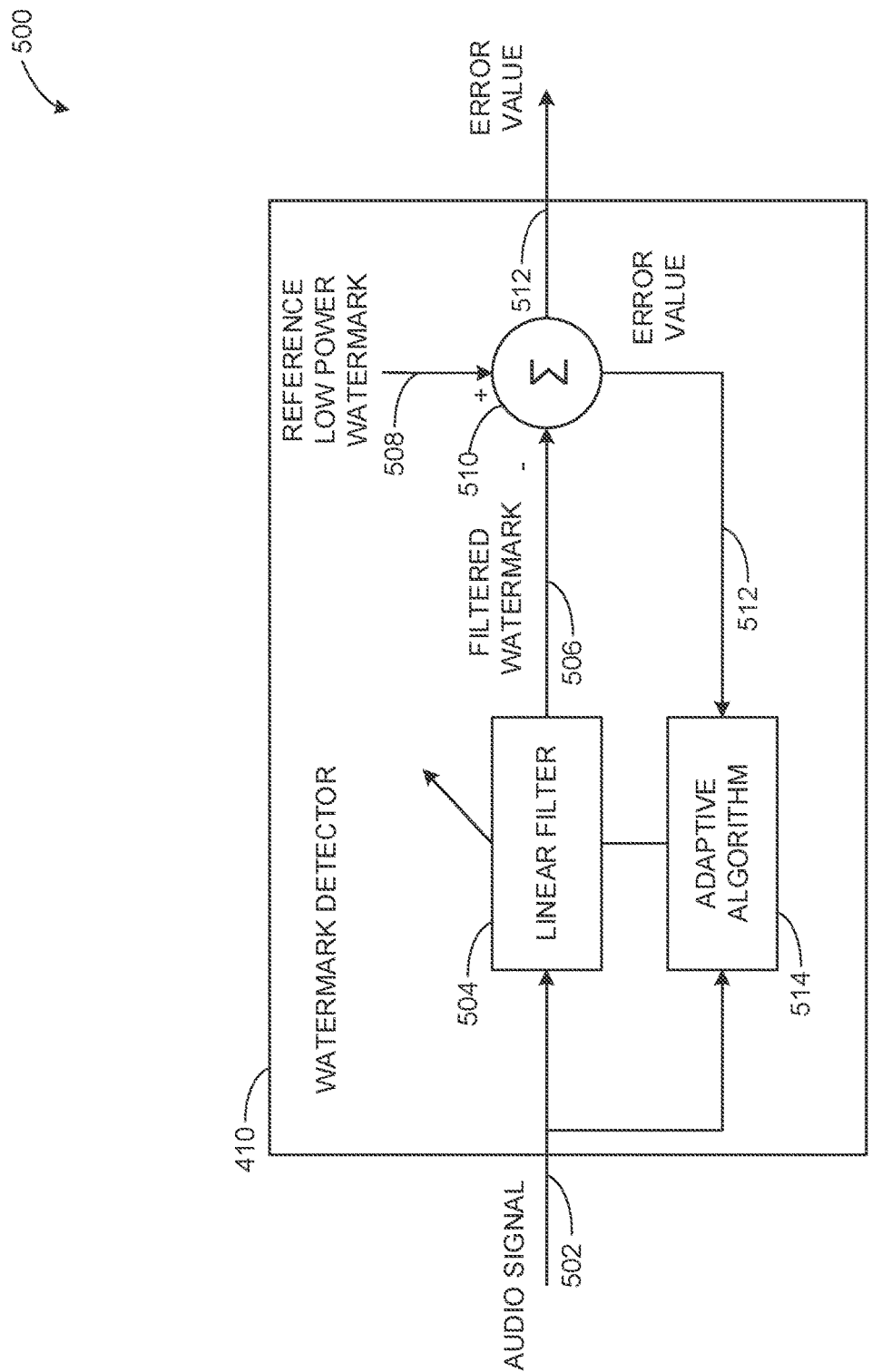
FIG. 5 is a block diagram showing an example implementation of the example watermark detector of FIG. 4 utilizing a least means squares filter algorithm.

FIG. 5 is a block diagram showing an example implementation of the example watermark detector 410 of FIG. 4 utilizing a least means squares filter algorithm. The example watermark detector 410 includes an example audio signal 502, an example linear filter 504, an example filtered watermark 506, an example reference low power watermark 508, an example summing function 510, an example error value 512, and an example adaptive algorithm 514.

The example linear filter 504 of the illustrated example of FIG. 5 receives the example audio signal 502 and performs linear filtering to isolate the low power watermark from the example audio signal 502. The example linear filter 504 may be configured with multiple coefficients that define the filtering operation. In some examples, the coefficients of the example linear filter 504 may be adjusted by an output of the example adaptive algorithm 514 in an effort to reduce the error value 512 associated with the filtered watermark 506 relative to the low power watermark 508 when the audio signal 502 includes the lower power watermark. The example linear filter 504 outputs the example filtered watermark 506, representative of the filter's attempt to isolate the low power watermark in the example audio signal 502. In some examples, where the example audio signal 502 does not include the low power watermark, the example filtered watermark 506 may be different than the low power watermark.

The example summing function 510 of the illustrated example of FIG. 5 receives the example filtered watermark 506 and the example reference low power watermark 508 and determines the difference between the two signals. The example summing function 510 may, for example, subtract the example filtered watermark from the example reference low power watermark 508, or perform the reverse operation. In some examples, the example summing function 510 may be any means of comparing two signals to determine a difference between them and output a value representative of the comparison. In some examples, the example summing function 510 outputs an error value representative of the difference between the example reference low power watermark 508 and the example filtered watermark 506. In some examples, the example summing function 510 outputs a determination corresponding to whether the example audio signal 502 includes the low power watermark. In such examples, the determination may be based on whether the difference between the example reference low power watermark 508 and the example filtered watermark 506 (e.g., an error value) satisfies a threshold. The example summing function 510 may additionally or alternatively perform any other operations to determine, based on the example filtered watermark 506 and the example reference low power watermark 508, whether the example audio signal 502 includes the low power watermark.

The example adaptive algorithm 514 of the illustrated example of FIG. 5 receives the example audio signal 512 and the example error value 512 and performs operations to adjust the coefficients of the example linear filter 504. The adaptive algorithm 514 adjusts the coefficients such that when an audio signal including the low power watermark is input to the example linear filter 504, the resulting filtered watermark 506 is similar enough to the example reference low power watermark 508 to enable detection of the low power watermark. In some examples, the example adaptive algorithm 512 adjusts the coefficients of the example linear filter 504 to reduce the error value received by adjusting the coefficients in a direction opposite of and of corresponding amplitude to the error value at a specific frequency. For example, the example adaptive algorithm 514, upon seeing a large error value (e.g., difference) between the example filtered watermark 506 and the example reference low power watermark 508 at a specific frequency, may adjust a coefficient corresponding to the frequency in the example linear filter 504 to attempt to reduce this error. In some examples, the adaptive algorithm 514 may adjust the example linear filter 504 and/or the example summing function 510 using any operation to make the example linear filter 504 more effective at isolating the low power watermark in the example audio signal 502.

In operation, the example audio signal 502 is input to the example linear filter 504 to generate the example filtered watermark 506. The example filtered watermark 506 is then input, along with the example reference low power watermark 508 to the example summing function 510 to determine the example error value 512. The example error value 512 is then input to the example adaptive algorithm 512 to update coefficients of the example linear filter 504 for improved low power watermark recognition.

While an example manner of implementing the watermark detector 410 is illustrated in FIG. 5, one or more of the elements, processes and/or devices illustrated in FIG. 5 may be combined, divided, re-arranged, omitted, eliminated and/or implemented in any other way. Further, the example audio signal 502, the example linear filter 504, the example filtered watermark 506, the example reference low power watermark 508, the example summing function 510, the example error value 512, the example adaptive algorithm 514 and/or, more generally, the example watermark detector 410 of FIG. 5 may be implemented by hardware, software, firmware and/or any combination of hardware, software and/or firmware. Thus, for example, any of the example audio signal 502, the example linear filter 504, the example filtered watermark 506, the example reference low power watermark 508, the example summing function 510, the example error value 512, the example adaptive algorithm 514 and/or, more generally, the example watermark detector 410 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio signal 502, the example linear filter 504, the example filtered watermark 506, the example reference low power watermark 508, the example summing function 510, the example error value 512, the example adaptive algorithm 514 and/or, more generally, the example watermark detector 410 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark detector 410 of FIG. 3 may include one or more elements, processes and/or devices in addition to, or instead of, those illustrated in FIG. 5, and/or may include more than one of any or all of the illustrated elements, processes and devices.

FIG. 6 is a schematic 600 of an example implementation of a media identification watermark and a low power watermark. The schematic 600 includes an example media identification watermark 602 including an example watermark length 604, an example start bit 606, an example station identification section 608, an example sync section 610, an example offset section 612, and an example timestamp section 614. The schematic 600 additionally includes an example low power watermark 616 including an example first bit 618 and an example second bit 620. The example media identification watermark 602 and the example low power watermark 616 are, in some examples, generated in accordance with the example instructions 700 by the example encoder 102 of FIGS. 1 and 3.

The example media identification watermark 602 of the illustrated example of FIG. 6 is a unique watermark specific to a media audio signal. The example media identification watermark 602 has an example watermark length 604 corresponding to the amount of information (e.g., the number of bits), and/or an amount of time between the start of the media identification watermark 602 and the end of the media identification watermark 602. In some examples, multiple media identification watermarks may be incorporated back-to-back into the media audio signal. The example watermark length 604 corresponds to the minimum length of the audio signal that includes the entire example media identification watermark 602. The example media identification watermark 602 additionally includes an example start bit 606. The example start bit 606 indicates the beginning of the watermark. In examples wherein there are multiple media signals being played consecutively, the example start bit 606 indicates the beginning of a new media signal, and/or a new watermark instance. Following the example start bit 606, the example media identification watermark 602 includes a station identification section 608. The example station identification section 608 includes bits that are encoded to specifically pertain to an identifying characteristic (e.g., a service provider, a media provider, a broadcaster, etc.) for the media. In some examples, the example station identification section 608 is useful for audience attribution, as it enables identification of the station that broadcast the example media identification watermark 602. The example media identification watermark 602 additionally includes an example sync bit 610 to align and decode an incoming asynchronous media identification watermark. The example media identification watermark 602 includes an example offset section 612 following the example sync bit 610. The example offset section 612 is a section that correlates with (e.g. may be equal to, may having a mathematical predictable relationship with, etc.) the first section (e.g., the station identification section 608, etc.) of the media identification watermark 602, providing validation of the media identification information included in the watermark. Following the example offset section 612, the example media identification watermark 602 includes an example timestamp section 614. The example timestamp section 614 includes bits corresponding to a time at which the example watermark is decoded. In the illustrated example of FIG. 6, the example media identification watermark 602 includes assigned letters corresponding to each bit (e.g., A, B, C, etc.). The example letters may correspond to a unique characteristic of the audio signal for the bit. For example, the letters may correspond to frequencies, phase values, and/or amplitude values at which the bit is encoded into the audio signal. The example bits are distinct from the audible, perceptible content of the audio signal and may have unique audio characteristics reflective of this.

The example low power watermark 616 of the illustrated example of FIG. 6 is a watermark with distinct characteristics from the example media identification watermark 602. The example low power watermark 616 includes an example first bit 618 (e.g., a first section/portion, a first watermark that is a part of the overall low power watermark 616, etc.) and an example second bit 620 (e.g., a second section/portion, a second watermark that is a part of the overall low power watermark 616, etc.). The example first bit 618 has an assigned letter of "Y," corresponding to the bit. As in the example media identification watermark 602, the assigned letter represents a unique characteristic of the audio signal corresponding to the letter. For example, bits including the assigned letter "Y" may have the same frequency, amplitude, and/or phase characteristics, the one or more characteristics being unique to bits with this assigned letter. In some examples, the "X" bit, section, and/or watermark includes a number of unique frequency tones. Similarly, the example second bit 620 has an assigned letter of "Z," corresponding to a unique characteristic of the bits assigned this letter. In some examples, the "Z" bit, section, and/or watermark includes a number of unique frequency tones, one or more of which are different than one or more of the frequency tones included in the "X" bit, section, and/or watermark. In some examples, the unique characteristics of the respective bits may make the low power watermark 616 distinct from the content of the audio signal, to ensure the low power watermark does not interfere with the audible content of the audio signal. In some examples, the example low power watermark 616 includes bits with the same characteristics as the example first bit 618 and the example second bit 620 in alternating order throughout the watermark length 604. The example low power watermark 616 is therefore highly predictable and easily identifiable, assuming the unique audio characteristics corresponding to the first bit 618 (e.g., the characteristic "Y") and the second bit 620 (e.g., the characteristic "Z") are selected to be distinct from the rest of the audio signal. In some examples, the low power watermark may have any pattern and/or configuration of audio characteristics to enable an easily identifiable watermark. In the illustrated example of FIG. 6, the low power watermark 616 has the same example watermark length 604 as the example media identification watermark 602. In some examples, the example low power watermark 616 may have any length. The example low power watermark 616 may additionally have any audio characteristics that enable a low power processor to detect the low power watermark. Unlike the example media identification watermark 602, the example low power watermark 616 has characteristics that may remain constant over numerous different audio signals to enable fast and low power detection of the example low power watermark 616.

Figure 7:
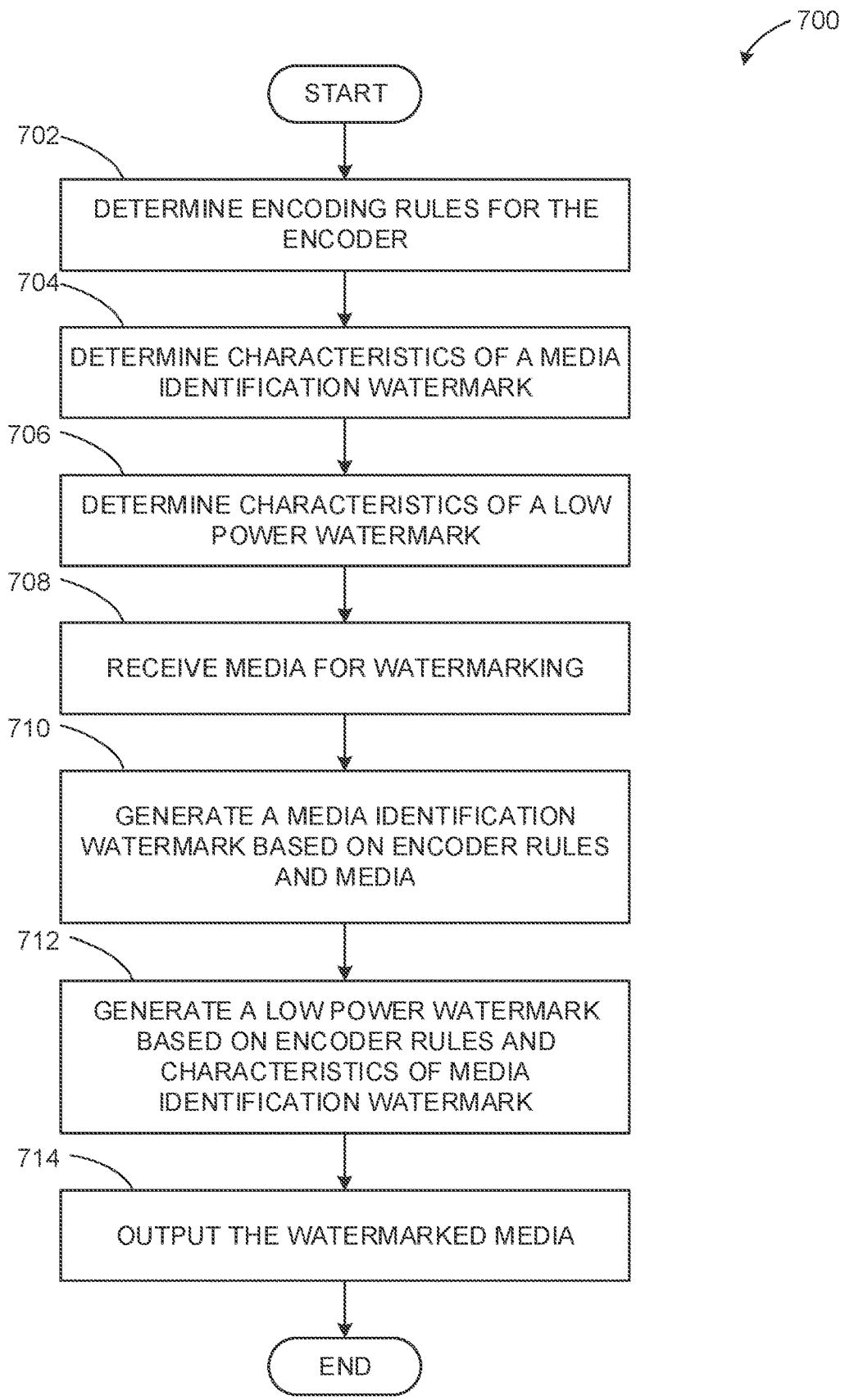
FIG. 7 is a flowchart representative of example machine readable instructions that may be executed to implement the example encoder to perform encoding of media identification and low power watermarks into a media signal.

A flowchart representative of example machine readable instructions for implementing the example encoder 102 of FIG. 3 is shown in FIG. 7. In this example, the machine readable instructions comprise a program for execution by a processor such as a processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 7, many other methods of implementing the example encoder 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 7 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Example machine readable instructions 700 that may be executed to perform encoding of media identification and low power watermarks into a media signal are illustrated in FIG. 7. With reference to the preceding figures and associated descriptions, the example machine readable instructions 700 of FIG. 7 begin with the example encoder 102 determining encoding rules for the encoder 102 (Block 702). In some examples, the example encoder rule manager 302 may determine encoding rules for the encoder by retrieving rules pertaining to encoding of media signals. The example encoder rule manager 302 stores rules (e.g., parameters, settings, etc.) relating to encoding media signals. In some examples, the rules may be overall rules associated with audio characteristics (e.g., amplitude limits, frequency limitations, etc.) that must be adhered to when encoding a media signal.

At block 704, the example encoder 102 determines characteristics of a media identification watermark. In some examples, the example media identification watermark manager 306 may store and/or access rules pertaining to the generation of media identification watermarks. In some examples, these rules may be similar to the rules stored and/or accessed by the example encoder rule manager 302. In some examples, the example media identification watermark manager 306 may access rules from a media provider, service provider, and/or any other entity that is involved in decoding the watermarks, and that controls the characteristics of media identification watermarks.

At block 706, the example encoder 102 determines characteristics of a low power watermark. In some examples, the example low power watermark manager 304 determines characteristics of a low power watermark. In some examples, the characteristics may be determined in coordination with the example encoder rule manager 302 and/or the example media identification watermark manager 306. In some examples, the characteristics of the low power watermark are determined to ensure the low power watermark has distinct audio characteristics relative to the media identification watermark and relative to the media content.

At block 708, the example encoder 102 receives media for watermarking. In some examples, the example audio signal receiver 310 receives a media audio signal from a content provider and/or other entity. The example media may be any media (e.g., a radio show, a song, a podcast, etc.) for which tracking (e.g., via watermarking) is to be implemented.

At block 710, the example encoder 102 generates a media identification watermark based on the encoder rules and media. In some examples, the example media identification watermark generator 312 generates a media identification watermark for the media received by the example audio signal receiver 310. In some examples, the example media identification watermark generator 312 may generate a media identification watermark including information from the media identification information received by the example encoder 102. In some examples, the media identification watermark is generated and incorporated into the media signal throughout the entire media signal. In some examples, the media identification watermark may be generated and incorporated at the beginning of the media signal, and/or periodically throughout the media signal. The example media identification watermark generator 312 communicates with the example media identification watermark manager 306 to determine characteristics with which the media identification watermark must comply. An example media identification watermark is illustrated in the illustrated example of FIG. 6.

At block 712, the example encoder 102 generates a low power watermark based on encoder rules and characteristics of the media identification watermark. In some examples, the example low power watermark generator 314 receives information from the example encoder rule manager 302 and the example media identification watermark manager 306 associated with rules pertaining to audio characteristics that the low power watermark must have. In some examples, the example low power watermark is generated and incorporated throughout the entire media signal. In some examples, the low power watermark is generated and incorporated at the beginning of the media signal, and/or periodically throughout the media signal.

At block 714, the example encoder 102 outputs the watermarked media. In some examples, the example watermarked audio signal outputter 316 outputs the watermarked media. The example watermarked audio signal outputter 316 outputs the watermarked media to a database for storage (e.g., the example watermarked media data store 104 of FIG. 1), and/or may directly output the watermarked media for transmission to an audience.

Figure 8:
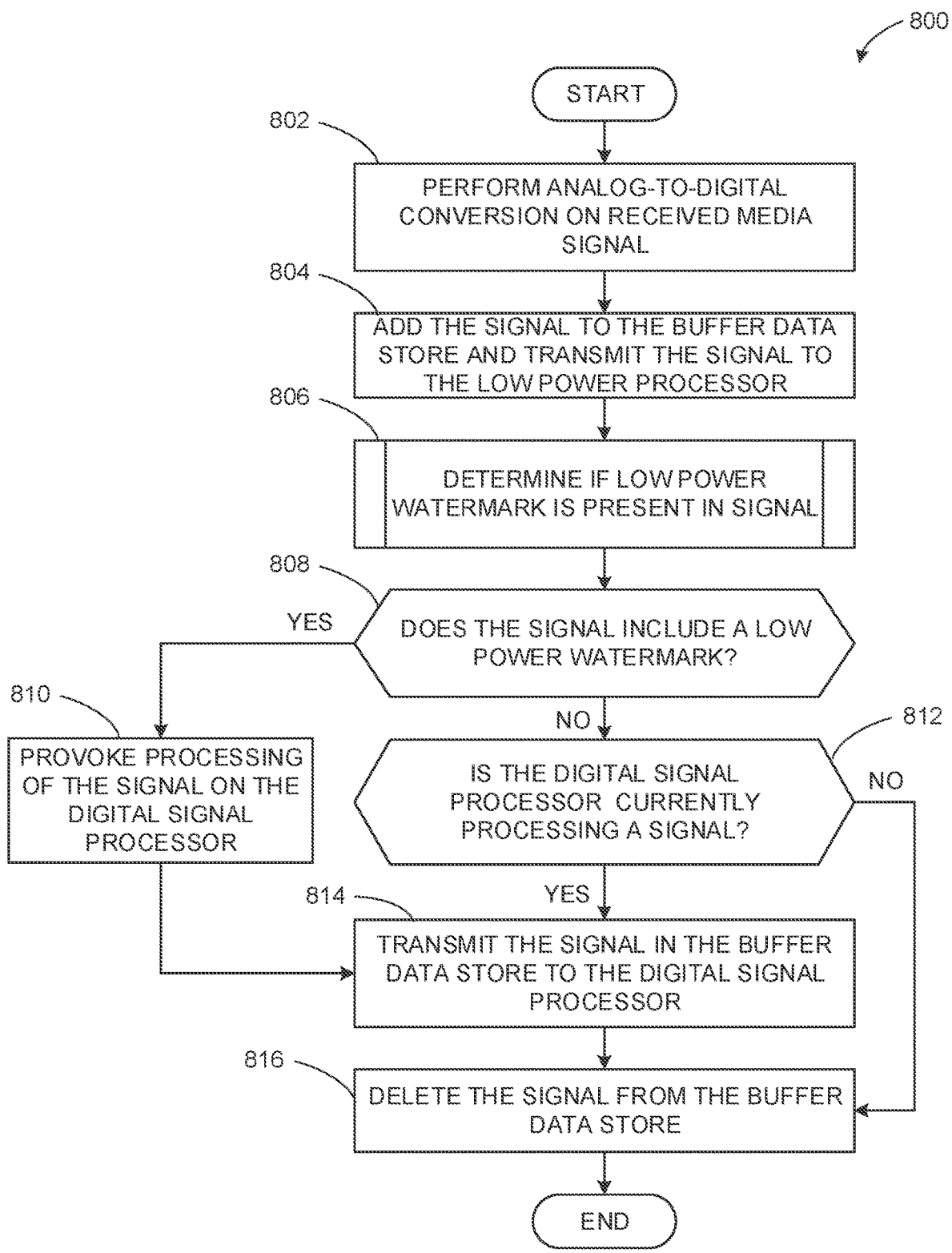
FIG. 8 is a flow chart representative of example machine readable instructions that may be executed to implement the example media monitor to perform signal identification using a low power watermark.
Figure 9:
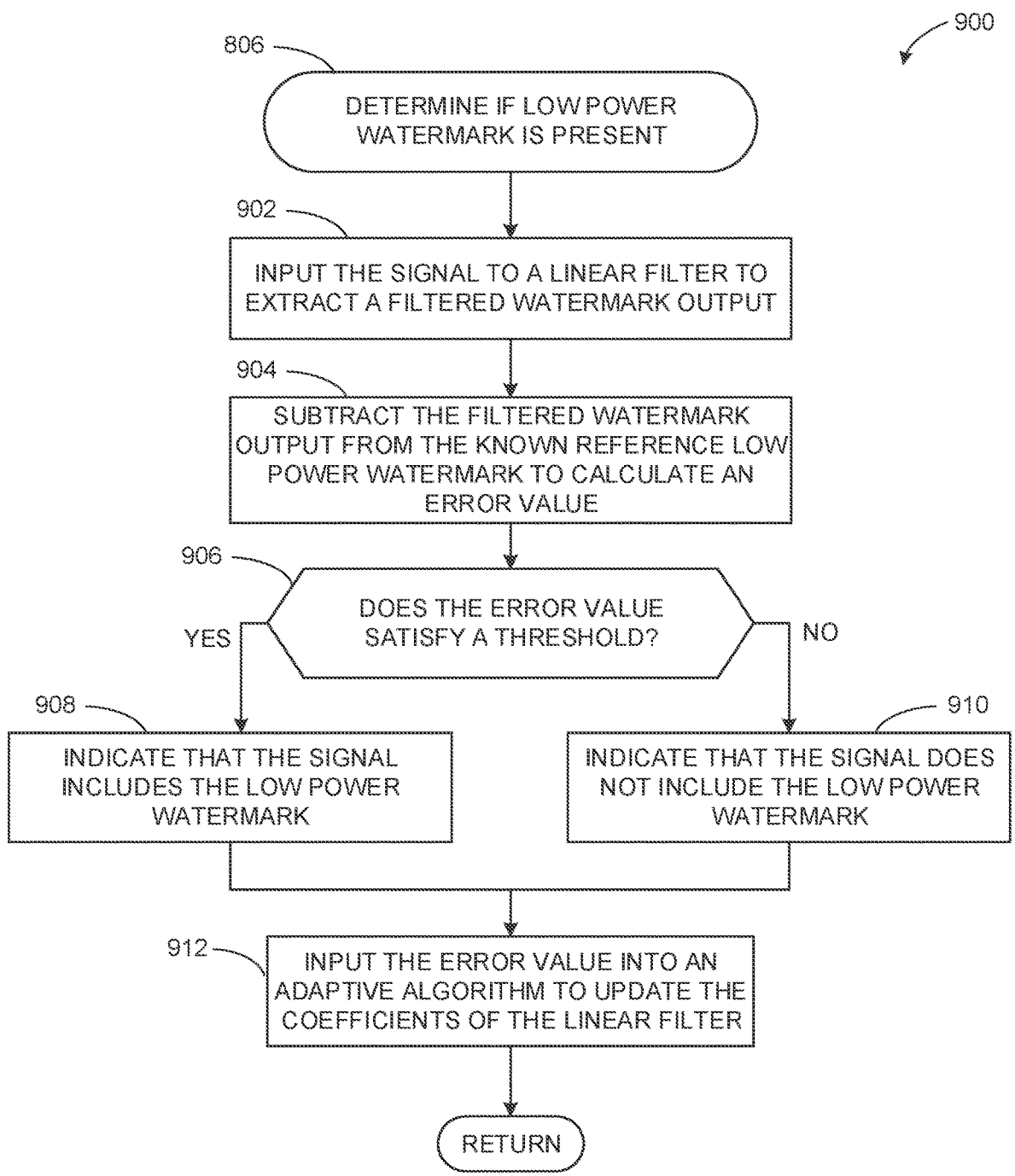
FIG. 9 is a flow chart representative of example machine readable instructions that may be executed to implement the example watermark detector to determine if a low power watermark is present in an audio signal using a least means square algorithm.

Flowcharts representative of example machine readable instructions for implementing the example media monitor 116 of FIG. 3 are shown in FIGS. 8-9. In this example, the machine readable instructions comprise a program for execution by a processor such as a processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 8-9, many other methods of implementing the example media monitor 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8-9 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Example machine readable instructions 800 that may be executed to perform signal identification using a low power watermark are illustrated in FIG. 8. With reference to the preceding figures and associated descriptions, the example machine readable instructions 800 of FIG. 8 begin with the example media monitor 116 performing analog-to-digital conversion on a received media signal (Block 802). In some examples, the example analog to digital converter 404 may perform analog-to-digital conversion on a received media signal. In some examples, the received media signal may already be a digital signal. In such examples, the media signal may be immediately received by the example digital signal receiver 408 and added to the example buffer data store 416.

At block 804, the example media monitor 116 adds the signal to the buffer data store and transmits the signal to the low power processor. In some examples, the example analog to digital converter 404 may add the signal to the example buffer data store 416 and transmit the signal to the example digital signal receiver 408. In some examples, the signal is directly transmitted to the example watermark detector 412, with or without temporary storage in the example buffer data store 416.

At block 806, the example media monitor 116 determines if a low power watermark is present in the signal. In some examples, the example watermark detector 412 determines if a low power watermark is present in the signal. In some examples, the example watermark detector 412 utilizes a least means squares algorithm to determine if a low power watermark is present. In some examples, any algorithm may be utilized to determine if a low power watermark is present. Example approaches for determining if a low power watermark is present in the signal are disclosed in further detail in connection with FIG. 9.

At block 808, the example media monitor 116 determines if the signal includes a low power watermark. In some examples, the example watermark detector 412 outputs an indication to the example digital signal processor initiator 414 as to whether the signal includes a low power watermark. In some examples, the example watermark detector 412 may output an error value, and/or other value representative of a comparison between an extracted low power watermark from the audio signal and a reference low power watermark. In some examples, the example watermark detector 412 and/or the example digital signal processor initiator 414 utilizes the value to determine if the signal includes the low power watermark. In response to the signal including a low power watermark, processing transfers to block 810. Conversely, in response to the signal not including a low power watermark, processing transfers to block 812.

At block 810, the example media monitor 116 provokes processing of the signal on the digital signal processor. In some examples, the example digital signal processor initiator 418 provokes processing of the signal on the example digital signal processor 418. In some examples, provoking processing includes changing the power state of the digital signal processor (e.g., changing the digital signal processor from an inactive state to an active state), initiating a media identification technique, ensuring the example digital signal processor 418 is ready to receive a media signal, and/or any other method of initiating a processing technique for media identification watermark extraction on the example digital signal processor 418.

At block 812, the example media monitor 116 determines if the digital signal processor is currently processing a signal. In some examples, the example digital signal processor initiator 414 may determine if the example digital signal processor 418 is currently processing a signal. The example digital signal processor initiator 414 determines if the example digital signal processor 418 is currently processing a signal to avoid deletion of an audio signal from the example buffer data store 416 that is currently being processed by the example digital signal processor 418, or is pending processing by the example digital signal processor 418. In response to the example digital signal processor 418 currently processing a signal, processing transfers to block 814. Conversely, in response to the example digital signal processor 418 not currently processing a signal, processing transfers to block 816.

At block 814, the example media monitor 116 transmits the signal in the example buffer data store 416 to the example digital signal processor 418. In some examples, the example digital signal processor initiator 414 communicates to the example buffer data store 416 to transmit the signal for which a low power watermark has been found to the example digital signal processor. In some examples, the example buffer data store 416 may transmit data currently stored in the example buffer data store 416 to the example digital signal processor 418. In some examples, the example buffer data store 416 continually transmits the audio signal received after the initial indication that the signal includes a low power watermark, until an indication from the example digital signal processor 418 (e.g., indicating that media identification watermarks have no longer been found, that the digital signal processor has changed to an inactive state, etc.) to cease transmission to the example digital signal processor 418. In some examples, the example watermark detector 412 may communicate with the example buffer data store 416 to cease transmission to the example digital signal processor 418 when the low power watermark is no longer detected. In some examples, the example buffer manager 410 may communicate with the example digital signal processor 418 and the example digital signal processor initiator 414 to control the transmission of signals to the example digital signal processor 418.

At block 816, the example media monitor 116 deletes the signal from the example buffer data store 416. In some examples, the example buffer manager 410 deletes the signal from the example buffer data store 416 in response to the example low power watermark not being found in the signal, in response to the digital signal processor 418 no longer finding media identification watermarks, in response to a specified amount of time since receiving the audio signal, and/or in response to any other condition. In some examples, the example digital signal processor 418 and/or the example digital signal processor initiator 414 may communicate with the example buffer manager 410 and/or the example buffer store 416 to delete audio signals that do not contain watermarks, or have already been processed by the example digital signal processor 418.

Example machine readable instructions 900 that may be executed to determine if a low power watermark is present in the signal using an example least means squares algorithm are illustrated in FIG. 9. With reference to the preceding figures and associated descriptions, the example machine readable instructions 900 of FIG. 8 begin with the example media monitor 116 inputting the example audio signal to a linear filter to extract a filtered watermark output (Block 902). In some examples, the example watermark detector 410 inputs the example audio signal 502 to the example linear filter 504 to extract an example filtered watermark 506. The example linear filter 504 may implement linear filtering on the example audio signal 502 using multiple coefficients that are adjusted by the example adaptive algorithm 514 to attempt to extract the low power watermark from the example audio signal 502.

At block 904, the example media monitor 116 subtracts the filtered watermark output from the known reference low power watermark to calculate an error value. In some examples, the example summing function 510 of the example watermark detector 410 subtracts the example filtered watermark 506 from the example reference low power watermark 508 to calculate the example error value 512. In some examples, any other method of performing a comparison between the example filtered watermark 506 and the example reference low power watermark 508 may be utilized. In some examples, any method capable of determining if the example filtered watermark 506 represents a low power watermark can be utilized.

At block 906, the example media monitor 116 determines if the error value satisfies a threshold. In some examples, the example digital signal processor initiator 414 may determine if the error value satisfies a threshold representative of the example filtered watermark 506 being similar to the example reference low power watermark 508. In some examples, the example watermark detector 410 may itself determine if the error value satisfies a threshold representative of the example filtered watermark 506 being similar to the example reference low power watermark 508, indicating the presence of a low power watermark in the signal. In response to the error value satisfying a threshold, processing transfers to block 908. Conversely, in response to the error value not satisfying a threshold, processing transfers to block 910.

At block 908, the example media monitor 116 indicates that the signal includes the low power watermark. In some examples, the example watermark detector 410, and/or the example digital signal processor initiator 414, indicate that the signal includes the low power watermark.

At block 910, the example media monitor 116 indicates that the signal does not include the low power watermark. In some examples, the example watermark detector 410, and/or the example digital signal processor initiator 414, indicate that the signal does not include the low power watermark.

At block 912, the example media monitor 116 inputs the error value into an adaptive algorithm to update the coefficients of the linear filter. In some examples, the example error value 512 is input to the example adaptive algorithm 514. The example adaptive algorithm 514 then updates the coefficients of the example linear filter 504 to attempt to minimize the example error value 512. For example, the example adaptive algorithm 514 may adjust the coefficients such that an example audio signal 502 including a low power watermark that is input to the example linear filter 504 subsequently results in a lower example error value 512 based on the new coefficients. As a result, the example linear filter 504 becomes more accurate at extracting and identifying the lower power watermark in the example audio signal 502, when the example audio signal 502 includes the low power watermark.

Figure 10:
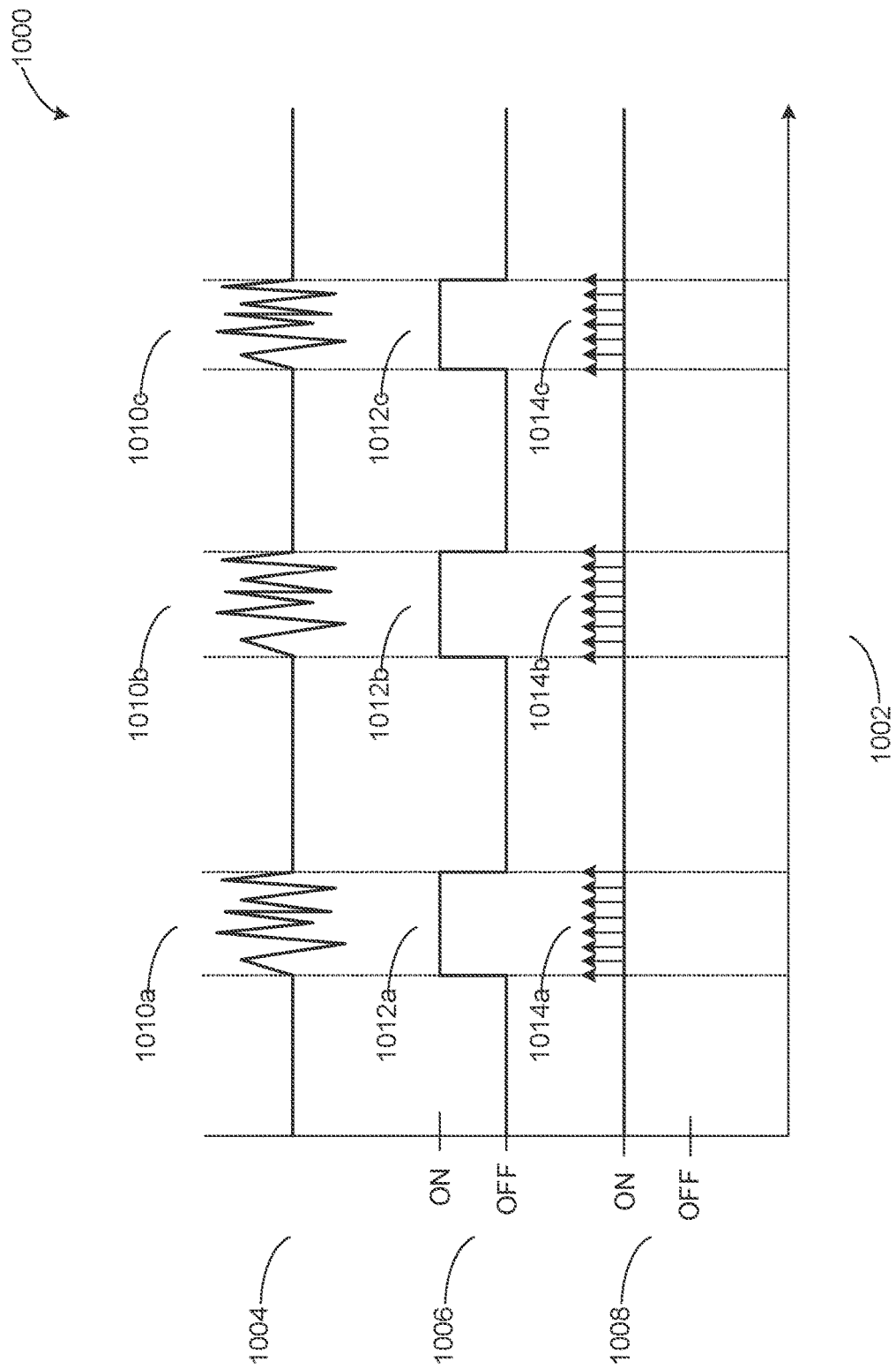
FIG. 10 is a schematic representation of an example implementation of the lower power watermark and the media identification watermark used for signal identification.

FIG. 10 is a schematic representation 1000 of an example implementation of the low power watermark utilized for signal identification. The example schematic representation 1000 includes three charts plotted against an example time axis 1002.

The example schematic representation 1000 includes an example media signal plot 1004 representing the amplitude of the media signal being presented. The example media signal plot 1004 is substantially flat (e.g., not changing in height along the vertical axis) when no media signal is being presented.

The example schematic representation 1000 further includes an example digital signal processor state representation plot 1006. The example digital signal processor state representation plot 1006 includes an "ON" value (e.g., representing the digital signal processor being in an active mode) and an "OFF" value (e.g., representing the digital signal processor being in an inactive mode).

The example schematic representation 1000 additionally includes an example low power processor state representation plot 1008. The example low power processor state representation plot 1008 includes an "ON" value (e.g., representing the low power processor being in an active mode) and an "OFF" value (e.g., representing the low power processor being in an inactive mode).

The example schematic representation 1000 includes three instances of media signals 1010a, 1010b, 1010c being presented, as shown in the example media signal plot 1004. Throughout the entire duration of the example schematic representation 1000, the example low power processor state representation plot 1008 indicates that the low power processor remains in the "ON" state. The example low power processor state representation plot 1008 also includes sets of arrows 1014a, 1014b, 1014c corresponding to recognition events where the low power processor detected the low power watermark. The example sets of arrows 1014a, 1014b, 1014c correspond to recognition events that coincide with the example media signals 1010a, 1010b, 1010c, indicating that the example media signals 1010a, 1010b, 1010c include the example low power watermark. The example sets of arrows 1014a, 1014b, 1014c additionally coincide with a change in the example digital signal processor representation plot 1006 from the "OFF" state to the "ON" state. The example digital signal processor active events 1012a, 1012b, 1012c indicate that the digital signal processor is in an active mode and performing processing on the audio signal. In some examples, the detection of the low power watermark, as indicated by the sets of arrows 1014a, 1014b, 1014c, cause the digital signal processor to go from the "OFF" state to the "ON" state.

The example schematic 1000 illustrates the potential power savings of utilizing the low power watermark media identification technique, as the digital signal processor state representation plot 1006 indicates that the digital signal processor is only in the "ON" state (e.g., an active, processing mode) when the audio signal is present. The addition of the low power watermark and corresponding low power processor consequently results in lower power consumption by reducing or eliminating power drain by the digital signal processor when there is no watermarked media to be processed.

Figure 11:
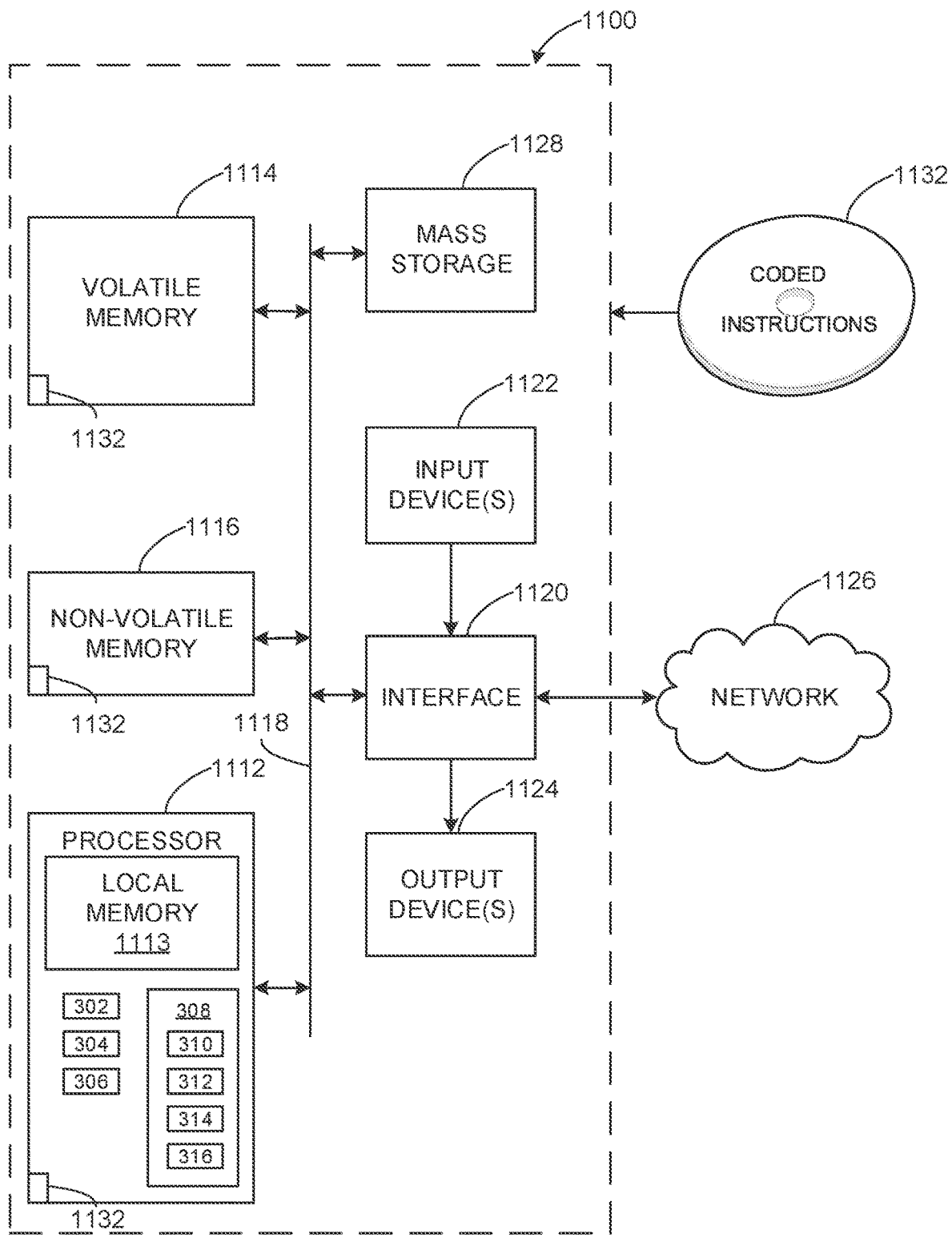
FIG. 11 is a schematic illustration of an example processor platform that may execute the instructions of FIG. 7 to implement the example encoder of FIGS. 1 and 3.

FIG. 11 is a block diagram of an example processor platform 1100 capable of executing the instructions of FIG. 7 to implement the example encoder 102 of FIG. 3. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example encoder rule manager 302, the example low power watermark manager 304, the example media identification watermark manager 306, the example media signal processor 308, the example audio signal receiver 310, the example media identification watermark generator 312, the example low power watermark generator 314, and/or the example watermarked audio signal outputter 316 of FIG. 3.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and DVD drives.

The coded instructions 1132 of FIG. 7 may be stored in the mass storage device 1128, in the volatile memory 1114, in the non-volatile memory 1116, and/or on a removable non-transitory computer readable storage medium such as a CD or DVD.

Figure 12:
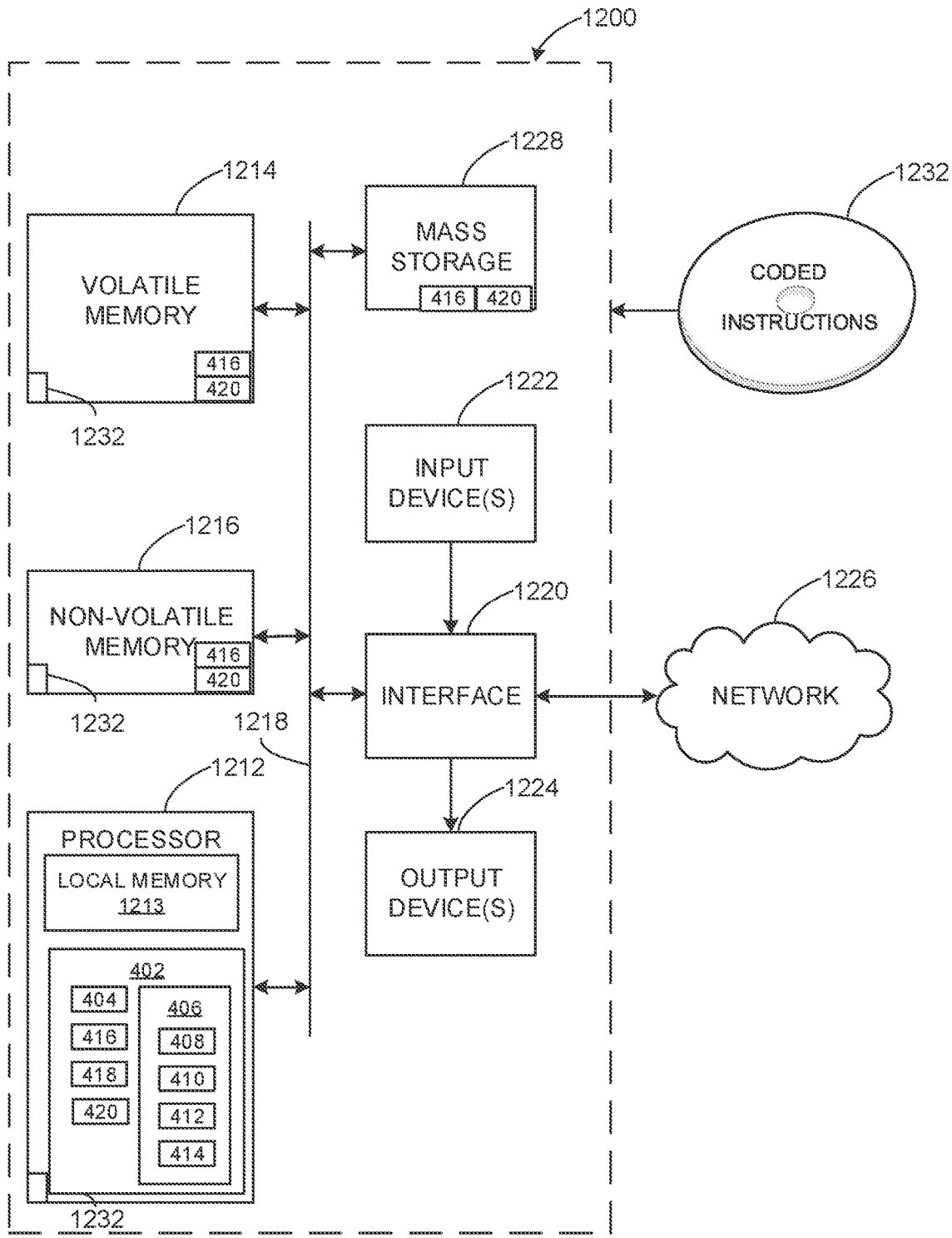
FIG. 12 is a schematic illustration of an example processor platform that may execute the instructions of FIGS. 8 and 9 to implement the example media monitor of FIGS. 1, 2 and 4.

FIG. 12 is a block diagram of an example processor platform 1200 capable of executing the instructions of FIGS. 8-9 to implement the example media monitor 116 of FIG. 4. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the example decoder 402, the example analog to digital converter 404, the example low power processor 406, the example digital signal receiver 408, the example buffer manager 410, the example watermark detector 412, the example digital signal processor initiator 414, the example buffer data store 416, the example digital signal processor 418, and/or the example data store 420 of FIG. 4.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a peripheral component interconnect (PCI) express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and DVD drives.

The coded instructions 1232 of FIGS. 7-8 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that enable an efficient media signal identification process using a low power watermark in addition to a media identification watermark. The encoding of a low power watermark with distinct audio characteristics relative to the media identification watermark and the content of the audio signal enables a low power processor utilizing a least means square algorithm to detect the presence of watermarked media and provoke the more power intensive media identification processing technique performed on a digital signal processor. The utilization of the low power watermark therefore enables extraction of media identification watermarks with significantly less power consumption by reducing processing utilization of the digital signal processor. Such improvements in power consumption are inherently beneficial to advancing the wireless capabilities and overall form factor of portable media monitors, among other devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system for watermark encoding, the computing system comprising:
    a processor; and
    a non-transitory computer-readable storage medium, having stored thereon program instructions that, upon execution by the processor, cause performance of a set of operations comprising:
        determining a set of characteristics of a first watermark, wherein the set of characteristics of the first watermark comprise at least one of a frequency, an amplitude, or a phase characteristic;
        determining a set of characteristics of a second watermark,
            wherein the determining the set of characteristics of the second watermark comprises ensuring that the set of characteristics of the first watermark is different from the set of characteristics of the second watermark;
        adding the first watermark, based on the set of characteristics of the first watermark, to a media signal; and
        adding the second watermark to the media signal;
            wherein the set of characteristics of the second watermark is different than the set of characteristics of the first watermark;
            wherein the set of characteristics of the second watermark comprises repeatable audio characteristics;
            wherein the repeatable audio characteristics comprise a first frequency and a second frequency, distinct from the first frequency; and
            wherein the first frequency and the second frequency alternate.

2. The computing system of claim 1, wherein the second watermark is optimized to maximize a watermark amplitude while maintaining audibility.

3. The computing system of claim 1, wherein the set of characteristics of the first watermark comprises a third frequency at which the first watermark is added.

4. The computing system of claim 3, wherein the third frequency at which the first watermark is added is different than the first frequency and the second frequency.

5. The computing system of claim 1, wherein the second watermark is added to the media signal at a beginning of the first watermark.

6. The computing system of claim 1, wherein the second watermark indicates a presence of the first watermark in the media signal; and wherein the first watermark comprises media identification information.

7. The computing system of claim 1, wherein a length of the second watermark equals a length of the first watermark.

8. The computing system of claim 7, wherein the second watermark is encoded at a beginning of the media signal.

9. A non-transitory computer-readable storage medium, having stored thereon program instructions that, upon execution by a processor, cause performance of a set of operations comprising:
    determining a set of characteristics of a first watermark, wherein the set of characteristics of the first watermark comprise at least one of a frequency, an amplitude, or a phase characteristic;

determining a set of characteristics of a second watermark, wherein the determining the set of characteristics of the second watermark comprises ensuring that the set of characteristics of the first watermark is different from the set of characteristics of the second watermark;

adding the first watermark, based on the set of characteristics of the first watermark, to a media signal; and adding the second watermark to the media signal,
wherein the set of characteristics of the second watermark is different than the set of characteristics of the first watermark;
wherein the set of characteristics of the second watermark comprises repeatable audio characteristics;
wherein the repeatable audio characteristics comprise a first frequency and a second frequency, distinct from the first frequency; and
wherein the first frequency and the second frequency alternate.

10. The non-transitory computer-readable storage medium of claim 9, wherein the second watermark is optimized to maximize a watermark amplitude while maintaining audibility.

11. The non-transitory computer-readable storage medium of claim 9, wherein the set of characteristics of the first watermark comprises a third frequency at which the first watermark is added.

12. The non-transitory computer-readable storage medium of claim 11, wherein the third frequency at which the first watermark is added is different than the first frequency and the second frequency.

13. The non-transitory computer-readable storage medium of claim 9, wherein the second watermark is added to the media signal at a beginning of the first watermark.

14. The non-transitory computer-readable storage medium of claim 9, wherein the second watermark indicates a presence of the first watermark in the media signal; and wherein the first watermark comprises media identification information.

15. A method for watermark encoding, the method comprising:

determining a set of characteristics of a first watermark, wherein the set of characteristics of the first watermark comprise at least one of a frequency, an amplitude, or a phase characteristic;

determining a set of characteristics of a second watermark, wherein the determining the set of characteristics of the second watermark comprises ensuring that the set of characteristics of the first watermark is different from the set of characteristics of the second watermark;

adding the first watermark, based on the set of characteristics of the first watermark, to a media signal; and adding the second watermark to the media signal,
wherein the set of characteristics of the second watermark is different than the set of characteristics of the first watermark;
wherein the set of characteristics of the second watermark comprises repeatable audio characteristics;
wherein the repeatable audio characteristics comprise a first frequency and a second frequency, distinct from the first frequency; and
wherein the first frequency and the second frequency alternate.

16. The method of claim 15, wherein the second watermark is optimized to maximize a watermark amplitude while maintaining audibility.

17. The method of claim 15, wherein the set of characteristics of the first watermark comprises a third frequency at which the first watermark is added.

18. The method of claim 17, wherein the third frequency at which the first watermark is added is different than the first frequency and the second frequency.

19. The method of claim 15, wherein the second watermark is added to the media signal at a beginning of the first watermark.

20. The method of claim 15, wherein ensuring the second watermark indicates a presence of the first watermark in the media signal; and wherein the first watermark comprises media identification information.

* * * * *